United States Patent
Aeron et al.

(10) Patent No.: US 11,500,086 B2
(45) Date of Patent: Nov. 15, 2022

(54) SYSTEM AND METHOD FOR TRACKING A DEFORMATION

(71) Applicant: Mitsubishi Electric Research Laboratories, Inc., Cambridge, MA (US)

(72) Inventors: Shuchin Aeron, Newton, MA (US); Yanting Ma, Allston, MA (US); Petros Boufounos, Winchester, MA (US); Hassan Mansour, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 232 days.

(21) Appl. No.: 17/034,139

(22) Filed: Sep. 28, 2020

(65) Prior Publication Data
US 2022/0099823 A1  Mar. 31, 2022

(51) Int. Cl.
*G01S 13/88* (2006.01)
*G01S 13/90* (2006.01)
*G06T 7/00* (2017.01)

(52) U.S. Cl.
CPC ........ *G01S 13/888* (2013.01); *G01S 13/9021* (2019.05); *G06T 7/0002* (2013.01); *G06T 2207/10044* (2013.01); *G06T 2207/10081* (2013.01); *G06T 2207/10088* (2013.01)

(58) Field of Classification Search
CPC ...... G01S 13/88; G01S 13/887; G01S 13/888; G06T 7/0002; G06T 2207/10044; G06T 2207/10081; G06T 2207/10088
See application file for complete search history.

(56) References Cited

U.S. PATENT DOCUMENTS

| | | | | |
|---|---|---|---|---|
| 4,050,068 A | * | 9/1977 | Berg | G01S 13/86 342/53 |
| 5,134,409 A | * | 7/1992 | De Groot | G01S 13/867 342/158 |
| 5,760,731 A | * | 6/1998 | Holmes | G01S 13/56 342/61 |
| 5,850,470 A | * | 12/1998 | Kung | G06K 9/6278 382/116 |
| 8,704,702 B2 | * | 4/2014 | van Dorp | G01S 13/87 342/126 |

(Continued)

*Primary Examiner* — Peter M Bythrow
(74) *Attorney, Agent, or Firm* — Gennadiy Vinokur; Hironori Tsukamoto

(57) ABSTRACT

An imaging system to reconstruct a reflectivity image of a scene including an object moving with the scene. A tracking system to track a deforming object to estimate an object deformation for each time step. Sensors acquire snapshots of the scene, each acquired snapshot of the object includes measurements in the object deformation for that time step, to produce a set of object measurements with deformed shapes over the time steps. Compute a correction to estimates of object deformation for each time step, with matching measurements of the corrected object deformation for each time step to measurements in the acquired snapshot of object for that time step. Select a corrected deformation over other corrected deformations for each time step, according to a distance between the corrected deformation and the estimate of the deformation, to obtain a final estimate of the deformation of the deformable object moving in the scene.

21 Claims, 21 Drawing Sheets

(56) References Cited

U.S. PATENT DOCUMENTS

| | | | |
|---|---|---|---|
| 9,500,746 B2* | 11/2016 | Miles | G01S 17/89 |
| 9,737,239 B2* | 8/2017 | Kimmel | A41H 1/02 |
| 10,222,466 B2* | 3/2019 | Schiessl | G01S 13/62 |
| 2004/0232329 A1* | 11/2004 | Biggs | G01S 7/03 |
| | | | 250/306 |
| 2008/0077015 A1* | 3/2008 | Boric-Lubecke | G01S 13/888 |
| | | | 600/453 |
| 2009/0121921 A1* | 5/2009 | Stickley | G01S 13/89 |
| | | | 342/179 |
| 2009/0284529 A1* | 11/2009 | De Aguiar | G06T 7/251 |
| | | | 345/474 |
| 2010/0214150 A1* | 8/2010 | Lovberg | H01Q 15/144 |
| | | | 342/22 |
| 2011/0044521 A1* | 2/2011 | Tewfik | G06V 10/754 |
| | | | 382/131 |
| 2011/0267221 A1* | 11/2011 | Brundick | G01S 13/02 |
| | | | 342/180 |
| 2012/0201428 A1* | 8/2012 | Joshi | G06T 11/006 |
| | | | 382/107 |
| 2014/0361921 A1* | 12/2014 | Aprile | G01S 13/9029 |
| | | | 342/25 B |
| 2015/0241563 A1* | 8/2015 | Veiga | G01S 7/486 |
| | | | 250/206.1 |
| 2015/0355325 A1* | 12/2015 | Bechhoefer | G01S 13/50 |
| | | | 342/118 |
| 2016/0135694 A1* | 5/2016 | van Dorp | G01S 13/88 |
| | | | 600/430 |
| 2017/0053407 A1* | 2/2017 | Benosman | G06T 7/246 |
| 2017/0363733 A1* | 12/2017 | Guerrini | G01S 13/72 |
| 2018/0085013 A1* | 3/2018 | Cho | A61B 5/7207 |
| 2019/0056276 A1* | 2/2019 | Poupyrev | G01S 13/88 |
| 2019/0195728 A1* | 6/2019 | Santra | G01M 5/0091 |
| 2019/0285740 A1* | 9/2019 | Boufounos | G01S 13/887 |
| 2019/0339214 A1* | 11/2019 | Trotta | G01S 13/88 |
| 2020/0124421 A1* | 4/2020 | Kang | G01C 21/30 |
| 2020/0191943 A1* | 6/2020 | Wu | G01S 13/726 |
| 2021/0180937 A1* | 6/2021 | Jin | G01S 13/86 |

\* cited by examiner

Algorithm 1 Intermediate estimate $\widehat{x}_i = F_1(A_i, y_i, x)$

1: $z_i = F_i x$
2: $v_i = a(z_i)$
3: for t = 1 to tMax do
4:   $u_i^t = a(x_i^t)$
5:   $P_i^* = \underset{P_i \in \Pi(u_i^t, v_i)}{\arg\min}\ OT(x, z_i)$
6:   $x_i^{t+1} = x_i^t - \gamma^t \nabla_{x_i} f(x, x_i^t)$

Output: $\widehat{x}_i = x_i^{\text{tMax}}, P_i^*$

FIG. 10B

Algorithm 2 Estimate signal $\hat{x} = F_2(x_1, \ldots, x_L)$

1: $u_i = b(x_i)$, $i = 1, \ldots, L$.
2: for t = 1 to tMax do
3:    for i=1 to L do
4:       $v_i^t = a(F_i x^t)$
5:       $P_i^* = \underset{P_i \in \Pi(u_i^t, v_i)}{\arg \min} OT(x, F_i x)$
6:    $x^{t+1} = x^t - \gamma^t \sum_{i=1}^{L} \nabla_x f(x^t, x_i)$

Output: $\hat{x} = x^{\text{tMax}}$, $P_i^*$

FIG. 10C

Algorithm 3 Estimation Iteration

Input: $A_i, F_i, y_i, i = 1, \ldots, L$.
Initialization for prototype image: $x^0$.

1: for t = 1 to tMax do
2:    for i = 1 to L do
3:       $x_i^t = F_1(A_i, y_i, x^{t-1})$
4:    $x^t = F_2(x_1^t, \ldots, x_L^t)$

Output: $\hat{x} = x^{\text{tMax}}, P_i^*$

FIG. 10D

FIG. 11A (Signal x)

(Estimate $F_i x$ of 1st permutation of x)

(Estimate $F_i x$ of 2nd different Permutation of x)

(Actual permutation $x_i = P_i F_i x$ of x observed by the acquisition system)

(Actual permutation $x_i = P_i F_i x$ of x observed by the acquisition system)

(NMSE as a function of measurement rate at various input SNR, where the number of views is 2. The shaded area represents one standard deviation below and above the mean)

(NMSE as a function of the number of views, where the measurement rate per view is 0.7 or 0.8 and the input SNR is 20dB. The shaded area represents one standard deviation below and above the mean.)

SYSTEM AND METHOD FOR TRACKING A DEFORMATION

FIELD

The present disclosure relates generally to sensing systems, and more particularly to sensing of deformable objects moving in a scene.

BACKGROUND

In several remote sensing applications, acquiring high-resolution radar images is necessary in order to meet some of the application and business requirements. For example, radar reflectivity imaging is used in various security, medical, and through-the-wall imaging (TWI) applications. Whereas the down-range resolution is mostly controlled by the bandwidth of the transmitted pulse, the cross-range (azimuth) resolution depends on the aperture of the radar sensors. Typically, the larger the aperture, the higher the image resolution is, regardless of whether the aperture is physical (a large antenna) or synthetic (a moving antenna). Currently, the increase of the physical size of antenna leads to a significant increase of the cost of the radar system. To that end, a number of radar imaging systems use synthetic-aperture methods to reduce the size of the antennas and the cost of radar imaging. For example, synthetic-aperture radar (SAR) and inverse SAR (ISAR) use the relative motion of the radar antenna and an object in the scene to provide finer spatial resolution with comparatively small physical antennas, i.e., smaller than the antennas of beam-scanning radars.

However, the small size of physical antennas of radar systems makes the tracking of deformable moving objects difficult. Specifically, tracking objects exhibiting arbitrary motion and deformation requires tracking sensitivity with minimum resolution greater than the resolution of the physical antennas resulting in an impractical cost of the radar imaging system. To that end, conventional radar and/or other electromagnetic or acoustic wave imaging systems require the object to be standing still in the scene or moving in a very controlled rigid motion. Even for the rigid motion, conventional radar imaging systems require a challenging tracking step to estimate the motion parameters of the moving object using only the radar data, before a radar image can be formed, see, e.g., Martorella 2014. (Martorella, M. (2014). *Introduction to inverse synthetic aperture radar. In Academic Press Library in Signal Processing* (Vol. 2, pp. 987-1042). Elsevier.)

Therefore, there is a need for imaging systems and methods suitable for determining unknown deformations or other permutations that might affect a signal during acquisition, or correct errors of an estimated deformation of a signal.

SUMMARY

The present disclosure relates to acquisition systems including sensing systems acquiring a signal under an unknown permutation(s), such as sensing of deformable objects moving in a scene.

Some embodiments relate to imaging systems, and more particularly to imaging systems that image a deformable object moving or undergoing deformations as it is being acquired using one or more snapshots. In these embodiments, the imaging system may reconstruct the image of the object under one or more deformations and may represent the object in a prototypical deformation.

In some embodiments the imaging system may comprise of one or more of the following sensors: camera, depth camera, radar, magnetic resonance imaging (MRI), ultrasonic, computer assisted tomography (CAT), LIDAR, terahertz, and hyperspectral, among others. One or more of those sensors may be used for tracking the deformation and one or more may be used for imaging the object. In some embodiments, the same sensor, or sensors, might be used to achieve both tracking and imaging.

Some embodiments provide an imaging system, for example comprising of an optical camera and a depth sensor, that allows tracking the motion of an object even if the object is deformable and the motion is not rigid. Some embodiments further provide a second imaging system, such as a radar or an ultrasonic array, that images the object as the object moves and deforms within the scene. Wherein the second imaging system reconstructs the image of the object moving in the scene with a resolution greater than a resolution governed by practically sized physical sensors, such as arrays of electromagnetic or ultrasonic sensors acquiring reflectivity images.

Some embodiments provide a radar imaging system suitable for airport security applications allowing a person to freely move in front of radar imaging system, while the radar imaging system is reconstructing a radar reflectivity image of the person. Some types of sensors used in gathering image data include using optical sensors, such as monochrome or color or infrared video cameras, or depth cameras or a combination thereof. The optical sensors are less expensive than electromagnetic sensors, along with operating in a modality that provides easier tracking of a target. Hence, an optical sensor can be used for tracking the motion of the target, even if the target is deformable and the motion is not rigid.

Further, some embodiments are based on another recognition that in a number of applications where radar imaging of deformable objects is necessary and useful, the object moving sufficiently close and visible to the radar imaging system, such that optical sensors can provide sufficient accuracy for tracking. Wherein, some embodiments are based on realization that by aiding the radar reconstruction using the optical motion tracking, the radar imaging system can be able to image very complex target objects that are moving.

An example where the target is clearly visible is security applications, in which people walk in front of a scanning system, e.g., in an airport. In some airport security scanners require subjects to be standing in a specific pose to be scanned for prohibited items. The scanning system according to one embodiment allows the subjects (which are the deformable moving objects, such as humans) to simply walk through the scanner while they are scanned, without any need to stop.

Some embodiments of the present disclosure include a radar imaging system configured to determine a radar reflectivity image of a scene including an object moving with the scene. The radar imaging system includes an optical sensor to track the object over a period of time to produce, for each time step, an object deformation. The radar imaging system can also include one or more electromagnetic sensors, such as a mmWave sensor, a THz imaging sensor, or a backscatter X-Ray sensor, or combinations thereof, to acquire snapshots of the object over the multiple time steps. Each snapshot includes measurements representing a radar reflectivity image of the object with a deformed shape defined by the corresponding deformation. Wherein, what was recognized is that one of the reasons preventing electromagnetic sensors of a radar imaging system to track a moving object, is a resolution of the electromagnetic sensing governed by a physical size of the antennas of the sensors. Specifically, for the practical reasons, the size of the antennas of the radar imaging system can allow to estimate only coarse image of the object at each time step. Such a coarse image can be suitable to track an object subject to rigid and finite transformation but can fail to recognize arbitrarily non-rigid transformation typical for the motion of a human.

Other embodiments of the present disclosure are based on another recognition that a radar imaging system can jointly use measurements of a scene acquired over multiple time steps. Such a system of measurements can be used to improve the resolution of the radar reflectivity image beyond a resolution governed by the size of the antennas of the radar imaging system. However, when the object is moving over time, at different time steps, the object can be located at different positions and can have a different shape caused by the non-rigid motion. Such a dislocation and deformation of the object make the system of measurements ambiguous, i.e., ill-posed, and difficult or impractical to solve. In particular, not rigidly moving objects can have different shape at different instances of time. To that end, at different time steps there can be different deformations of the shape of the object with respect to its nominal shape and different transformations of a radar reflectivity image observed by the radar imaging system with respect to a radar reflectivity image of the object.

Other embodiments of the present disclosure are based on another recognition that an imaging system might be mounted on a mounted on a moving platform, obtaining snapshots of its surroundings as it moves, and that deformation of its input is due to changes in the geometry of the environment as the imaging system moves with the platform. Thus, each snapshot of the environment includes a deformation, and the deformation itself provides information about the motion of the sensor and the moving platform in the environment. In addition, rough, or more precise determination of the deformation can often be performed using one of many approaches in the art, known collectively as simultaneous localization and mapping (SLAM) methods. Embodiments of the present disclosure can be used to refine the output of completely replace SLAM methods.

For example, some embodiments of the present disclosure use an existing SLAM algorithm in the art, to compute an estimate of the deformation of the scene that is observed by the sensors. This estimate is refined such that the data acquired by the sensors at each snapshot is matched when the refined deformation estimate is applied.

In many problems in the art, including SLAM, unlabeled sensing, and imaging of deformable objects while in motion, there is a problem of recovering a signal that is measures subject to unknown perturbation. Some embodiments of the present disclosure are based on the realization that in most practical permutations, the unknown permutations are not arbitrary but some unknown permutations are more likely to occur than others.

Based on this realization, and to further exploit this, some embodiments of the present disclosure include a regularization function that promotes the more likely permutations in the solution. Through experimentation, what was learned from this approach is that, even though the general problem is not convex, an appropriate relaxation of the resulting regularized problem allowed for an exploiting of the well-developed machinery of the theory of optimal transport (OT), and to develop a tractable algorithm.

A key realization that allows using OT to develop a tractable algorithm is that an unknown deformation or an unknown permutation of one signal to another is equivalent to transporting notional mass between pixels such that the mass transported from one signal to the other is inducing a deformation of the signal. The theory of OT can therefore guide this transport such that it happens optimally, i.e., recovers the optimal deformation or permutation that explains the acquired snapshots.

A further realization is that the existence of a notion of a transport cost in the OT theory can be used to provide regularization that favors more likely permutations or deformation. In particular, the theory of optimal transport (OT) determines a mass transport plan that is optimal when considering the total cost of transferring the mass, wherein the cost of transferring the mass from one pixel to another can be determined by the application. If a deformation of the signal is more likely than another, then the corresponding total cost of the transport of each pixel in this deformation is lower than the corresponding cost in a less likely deformation and, thus, the transport corresponding to more likely deformation is preferable by OT recovery theory and algorithms.

Another realization is that in some practical applications the deformations and permutations that are most likely are the ones in which pixels are not transported very far from their original location and, therefore, the cost of moving the pixel to a nearby location is lower than the cost of moving the pixel to a farther location. Therefore, a transport cost that penalizes mass moving closer less than mass moving farther can be used as a regularization. Since such transport costs are well studied in the art of OT, this realization provides the use of much better developed OT algorithms to estimate the OT plan.

A similar realization is that some other practical applications the deformations and permutations that are most likely are the ones in which pixels are not transported very far from where their nearby pixels are transported and, therefore, the cost of moving the pixel to a new location is lower if the nearby pixels are also moved nearby the new location, compared to the cost of moving the pixel to location farther from where the nearby pixels are moved to. Therefore, a transport cost that penalizes mass moving together less than mass separating can be used as a regularization. Since such transport costs are also well studied in the art of optimal transport (OT), this realization provides the use of much better developed OT algorithms to estimate the OT plan.

Another key realization is that certain deformations might include occlusions of parts of the signal, and different snapshots might exhibit different deformations that include different occlusions of the signal. Furthermore, certain patterns of occlusion are more likely to occur than others. For example, since nearby pixels of an object move together, they are more likely to also be occluded together from another part of the object. As an example, a human walking in front of a camera might swing the arms as part of the walking motion. It is very likely that the whole arm away from the camera is occluded by the body. Furthermore, nearby points on the arm are likely to be occluded together as the arm moves behind the body. The closer the points are the more likely they are to be behind the body at the same time.

In these cases, optimal transport (OT) theory allows for additional cost to be considered in the total cost when adding or removing mass from the signal. In the OT art, the subfield is sometimes referred to as unbalanced OT or partial OT. However, existing methods in the art do not consider that mass, i.e., pixels, located nearby is more likely to disappear or appear together than mass not located together. For this reason, some embodiments of the present disclosure may introduce a different cost in computing the plan that incorporates the structure of the mass difference between the two deformations in order to reduce the cost of deformations in which nearby pixels appear or disappear together, and thus consider such deformations more likely than one in which the pixels appearing and disappearing are not nearby.

Some embodiments of the present disclosure include systems and methods to determine signals that have been observed with multiple snapshots, subject to a different permutation in each snapshot. Wherein, these systems and methods exploit the knowledge that certain permutations are more likely than others, in order to effectively determine the signal. Such that, by using optimal transport theory to incorporate this knowledge in the solution, these systems and methods can determine the unknown signal much more effectively than the conventional imaging system approaches.

For example, some test approaches included using an alternative modality to track the deformable object. Other test approaches included an imaging system for multimodal imaging with deformations, assuming one modality is used to determine the deformation and another modality to perform the imaging. Wherein these approaches taught that when determining the deformation, the deformation introduced errors, and that these test approaches provided some simple methods to correct these induced errors. Unfortunately, what was later discovered after further test experiments is that these test approaches simply did do not work very well. For example, the modality used to track the object did not have the resolution required by the radar system and the tracking was prone to errors. In such approaches, the reconstruction was not accurate. It is, therefore, desirable that the imaging process should also refine the tracking and correct the imprecisions in estimating the object deformations, if possible. Based upon this discovery, the present disclosure systems and methods would have to perform much better in correcting the errors in the deformations.

Still other test approaches included applications that included steps necessary to recover a signal observed through multiple snapshots, such that each underwent an unknown or partially known deformation or a scrambling, i.e., a permutation of the signal. In this case the objective was to recover the permutation, in addition to recovering the signal. This proved to be a difficult problem, as the number of possible permutations increased exponentially with the size of the signal. In a number of test applications, certain permutations were more likely than others. It would be desirable to be able to exploit this information to reduce the difficulty of the problem. However, in the current state of the art it is not known how this information can be used effectively.

Still some other test approaches were developed to analyze imaging of a deformable moving object using Inverse Synthetic Aperture Radar, ISAR. However, what was later discovered is that these systems cannot consider deformations of the object, for example, hands moving while a person is walking or heart beating of a person. What was also learned is that these test approaches also do not consider errors in the model of the object motion. Which these test approaches when addressing these errors necessitate techniques that were very computationally cost expensive or robust to errors, such as incoherent imaging in the case of radar, which compromise imaging quality.

Other test approaches included recovering a signal observed through unknown permutations. However, during the testing process we realized no known methods disclose recovery of a permuted signal measured through a measurement system. In these particular test approaches it became evident that known methods only consider direct observation of the permuted signal. What was realized is that adding a measurement system is not obvious because a measurement system combines elements of the permuted signal. Some methods used in these particular test approaches simply will not work if the elements of the signal are combined into measurements by the measurement system of some embodiments of the present disclosure. Furthermore, these particular methods used in test approaches cannot exploit the knowledge on the permutation matrix, i.e. that permutations that move image pixels closer are more likely than permutations that move image pixels farther.

Some methods in the test approaches resulted in providing some correction of the deformation using the measurements. However, in those test cases, the computation was simplistic and often failed. Gained from these test cases is that some embodiments of the present disclosure exploit formulations that provides the use of optimal transport theory and algorithms to correctly estimate both the deformations and their corrections.

Some test approaches combine information from different modalities. At least some problems with the test approaches is that the sensor(s) in the modality (or modalities) used for tracking, made errors and had a lower resolution than that which the imaging sensor required. These test approaches/applications assumed the errors away, which resulted to inferior performance. Gained from these test approaches, is that some embodiments of the present disclosure are configured to provide a correction of the tracking that is in a higher resolution than required by the imaging sensor(s).

Furthermore, some important realizations gained from experimentation, was that both problems, namely imaging of deformable objects under deformations and that recovering a signal observed though unknown permutation, can be expressed using the same underlying formulation. Having completed extensive experimentation, this new knowledge is not obvious because these are two very different problems with very different applications. The former, imaging of deformable objects under deformations has applications in medical imaging and security screening, among others, while the latter, recovering a signal observed though unknown permutation has applications in unlabeled and partially labeled sampling and simultaneous localization and mapping (SLAM), among others.

Thus, this formulation incorporated in some embodiments of the present disclosure includes
  (1) an unknown signal x being measured by taking one or more snapshots;
  (2) a linear transformation of the signal being measured in any snapshot ($F_i$);
  (3) an unknown permutation that affects the signal ($P_i$);
  (4) a measurement system ($A_i$), that may or may not be the identity system which directly measures the signal; and
  (5) a set of measurements $y_i$ of the unknown transformed permuted signal.

Another important realization of the present disclosure is that this formulation can be further relaxed, to allow for softer solutions. Which this can allow to compute the gradient of the cost function, which provides its optimization using gradient-based algorithms. The cost is discrete without the relaxation, and therefore has no gradient. The optimization is combinatorial in that case, which has prohibitive computational complexity for any problem of reasonably practical size.

Another realization is that this particular choice of relaxation provides for the use of efficient methods based on optimal transport, which are able to provide better solutions and are more likely to converge to a good optimum. The problem is non-convex and, therefore, naïve relaxations end up exhibiting too many local minima, and not providing good solutions to the problem. Another important realization is that the permutation matrices $P_i$ do not need to be estimated explicitly and only an estimate of the signal x is required. This further provides the use of optimal transport methods, which provide a "transport plan" which implicitly estimates the permutation.

Another important realization is that when the problem is relaxed as described above, it becomes a bilinear problem. Thus, the problem can be efficiently solved using alternating minimization, where the algorithm alternates between estimating the original signal x and estimating the permuted transformed signals $x_i$ that the measurement systems measures in each snapshot.

According to an embodiment of the present disclosure, an imaging system including a tracking system to track a deforming object within a scene over multiple time steps for a period of time to produce an initial estimate of a deformation of the object moving for each time step. A measurement sensor captures measurements of the object deforming in the scene over the multiple time steps for the time period as measurement data, by capturing snapshots of the object moving over the multiple time steps. A processor that calculates, for the measurement data, deformation information of the deforming object. Each acquired snapshot of the object includes measurements of the object in a deformation for that time step in the measurement data, to produce a set of measurements of the object with deformed shapes over the multiple time steps. For each time step of the multiple time steps, the processor sequentially calculates deformation information of object, by computing a correction to the estimates of the deformation of the object. Such that the correction includes matching measurements of the corrected deformation of the object for each time step to measurements in the acquired snapshot of the object for that time step. Wherein for each time step, a corrected deformation is selected over other corrected deformations for that time step, according to a distance between the corrected deformation and the initial estimate of the deformation, to obtain a final estimate of the deformation of the deformable object moving in the scene and a final image of the object moving within the scene.

According to another embodiment of the present disclosure, an image processing method including tracking a deforming object while moving within a scene over multiple time steps for a period of time via a tracking system to produce an initial estimate of a deformation of the object for each time step. Acquiring measurement data by continuously capturing snapshots of the object deforming in the scene over the multiple time steps for the period of time. Computing deformation information of the deforming object, by producing a set of measurements of the object with deformed shapes over the multiple time steps, from each acquired snapshot of the object that includes measurements of the object in a deformation for that time step in the measurement data. Calculating deformation information of object, by computing a correction to the estimates of the deformation of the object for each time step for the multiple time steps. Wherein the computing of the correction includes matching measurements of the corrected deformation of the object for each time step to measurements in the acquired snapshot of the object for that time step. Wherein for each time step, selecting a corrected deformation over other corrected deformations for that time step, according to a distance between the corrected deformation and the initial estimate of the deformation, to obtain a final estimate of the deformation of the deformable object moving in the scene and a final image of the object moving within the scene, which are stored.

According to another embodiment of the present disclosure, a production apparatus including a tracking system to track a deforming object within a scene over multiple time steps for a period of time to produce an initial estimate of a deformation of the object for each time step. A measurement sensor including an electromagnetic sensor captures measurement of the object deforming in the scene over the multiple time steps for the time period as measurement data, by capturing snapshots of the object moving over the multiple time steps. A processor calculates, for the measurement data, deformation information of the deforming object. Each acquired snapshot of the object includes measurements of the object in a deformation for that time step, to produce a set of measurements of the object with deformed shapes over the multiple time steps in the measurement data. For each time step of the multiple time steps, the processor sequentially calculates deformation information of object, by computing a correction to the estimates of the deformation of the object for each time step for the multiple time steps. Wherein the correction includes matching measurements of the corrected deformation of the object for each time step to measurements in the acquired snapshot of the object for that time step. Wherein for each time step, a corrected deformation is selected over other corrected deformations for that time step, according to a distance between the corrected deformation and the initial estimate of the deformation, to obtain a final estimate of the deformation of the deformable object moving in the scene and a final image of the object moving within the scene, which are stored.

According to another embodiment of the present disclosure, a radar system. The system including a tracking system tracking a deforming object while moving within the scene over multiple time steps for a period of time to produce an initial estimate of a deformation of the object moving for each time step, such that at each time step includes a different deformation. A sensor captures measurements of the object deforming in the scene over the multiple time steps for the time period as measurement data, by capturing snapshots of the object moving over the multiple time steps. A processor that calculates, for the measurement data, deformation information of the deforming object. Each acquired snapshot of the object includes measurements of the object in a deformation for that time step, to produce a set of measurements of the object with deformed shapes over the multiple time steps in the measurement data. For each time step of the multiple time steps, the processor sequentially calculates deformation information of object, by computing a correction to the initial estimates of the deformation of the object for each time step for the multiple time steps. Such that the correction includes matching measurements of the corrected deformation of the object for each time step to measurements in the acquired snapshot of the object for that time step. Wherein for each time step, a corrected deformation is selected over other corrected deformations for that time step, according to a distance between the corrected deformation and the initial estimate of the deformation, to obtain a final estimate of the deformation of the deformable object moving in the scene and a final image of the object moving within the scene. An output interface outputs the final estimate of the deformation of the deformable object, the final image of the object moving within the scene, or both, to one or more components of an output interface of the radar system, or to another system or a communication network associated with the radar system.

According to another embodiment of the present disclosure, a radar imaging method to reconstruct a radar reflectivity image of a scene. Tracking a deforming object while moving within the scene over multiple time steps for a period of time with a tracking system, to produce an initial estimate of a deformation of the object for each time step of the multiple time steps. At least one electromagnetic sensor captures measurements of the object deforming in the scene over the multiple time steps for the time period as measurement data, by capturing snapshots of the object moving over the multiple time steps. Each acquired snapshot of the object includes measurements of the object in a deformation for that time step, to produce a set of measurements of the object with deformed shapes over the multiple time steps in the measurement data. The method including using a processor for calculating deformation information of object, by computing a correction to the estimates of the deformation of the object for each time step for the multiple time steps. Such that the computing of the correction includes matching measurements of the corrected deformation of the object for each time step to measurements in the acquired snapshot of the object for that time step. Wherein for each time step, selecting a corrected deformation over other corrected deformations for that time step, according to a distance between the corrected deformation and the initial estimate of the deformation, to obtain a final estimate of the deformation of the deformable object moving in the scene and a final radar image of the object deforming within the scene. Outputting one or a combination of the final estimate of the deformation of the deformable object or the final radar image of the object, to one or more components of the radar system or another system associated with the radar system.

According to another embodiment of the present disclosure, a non-transitory computer readable storage medium embodied thereon a program executable by a processor for performing a radar imaging method. The radar imaging method is to reconstruct a radar reflectivity image of a scene including an object deforming within the scene. Tracking the deforming object that deforms over multiple time steps for a period of time using a tracking system having an optical sensor to produce an initial estimate of a deformation of the object for each time step of the multiple time steps. Acquiring measurement data by continuously capturing snapshots of the object deforming in the scene over the multiple time steps for the period of time. Such that, at each time step includes a different deformation. The method including computing deformation information of the deforming object, by producing a set of measurements of the object with deformed shapes over the multiple time steps, from each acquired snapshot of the object that includes measurements of the object in a deformation for that time step in the measurement data. Calculating deformation information of object, by computing a correction to the estimates of the deformation of the object for each time step for the multiple time steps. Wherein the computing of the correction includes matching measurements of the corrected deformation of the object for each time step to measurements in the acquired snapshot of the object for that time step. Wherein for each time step, selecting a corrected deformation over other corrected deformations for that time step, according to a distance between the corrected deformation and the initial estimate of the deformation, to obtain a final estimate of the deformation of the deformable object moving in the scene and a final radar image of the object deforming within the scene, which are stored. Outputting the final estimate of the deformation of the deformable object within the scene, the final radar image of the object within the scene, or both, to one or more components of the radar system or a communication network associated with the radar system.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 10B, FIG. 10C and FIG. 10D show pseudocode implementing aspects of the flowchart in FIG. 10A, according to some embodiments of the present disclosure;

FIG. 11A to FIG. 11E show experimentation performed on example embodiments, FIG. 11A shows a signal x in a prototypical position, FIG. 11B shows a $F_i x$ $1^{st}$ estimated deformation of the snapshot, FIG. 11C shows a $F_i x$ $2^{nd}$ estimated deformation of the snapshot, FIG. 11D and FIG.

Figure 11B:
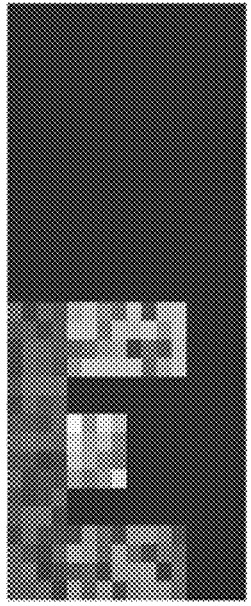
Figure 11B:
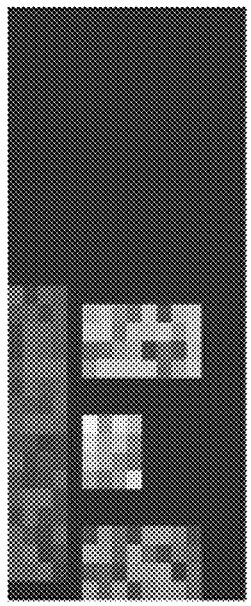
Figure 11C:
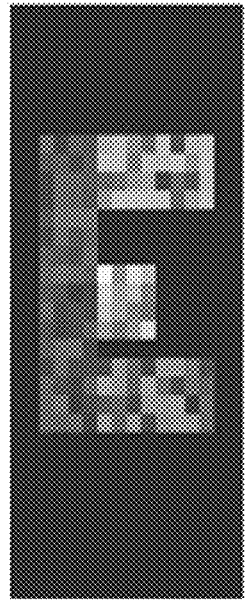
Figure 11D:
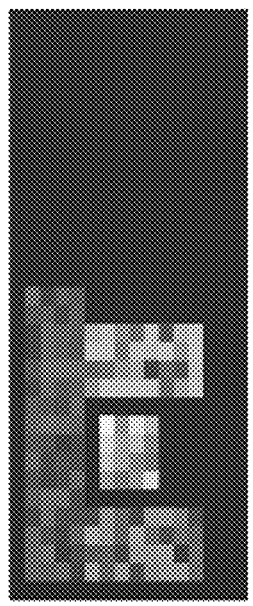
Figure 11E:
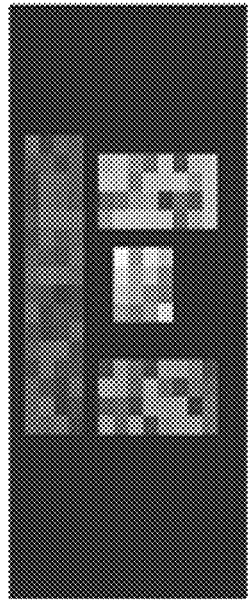
Figure 12A:
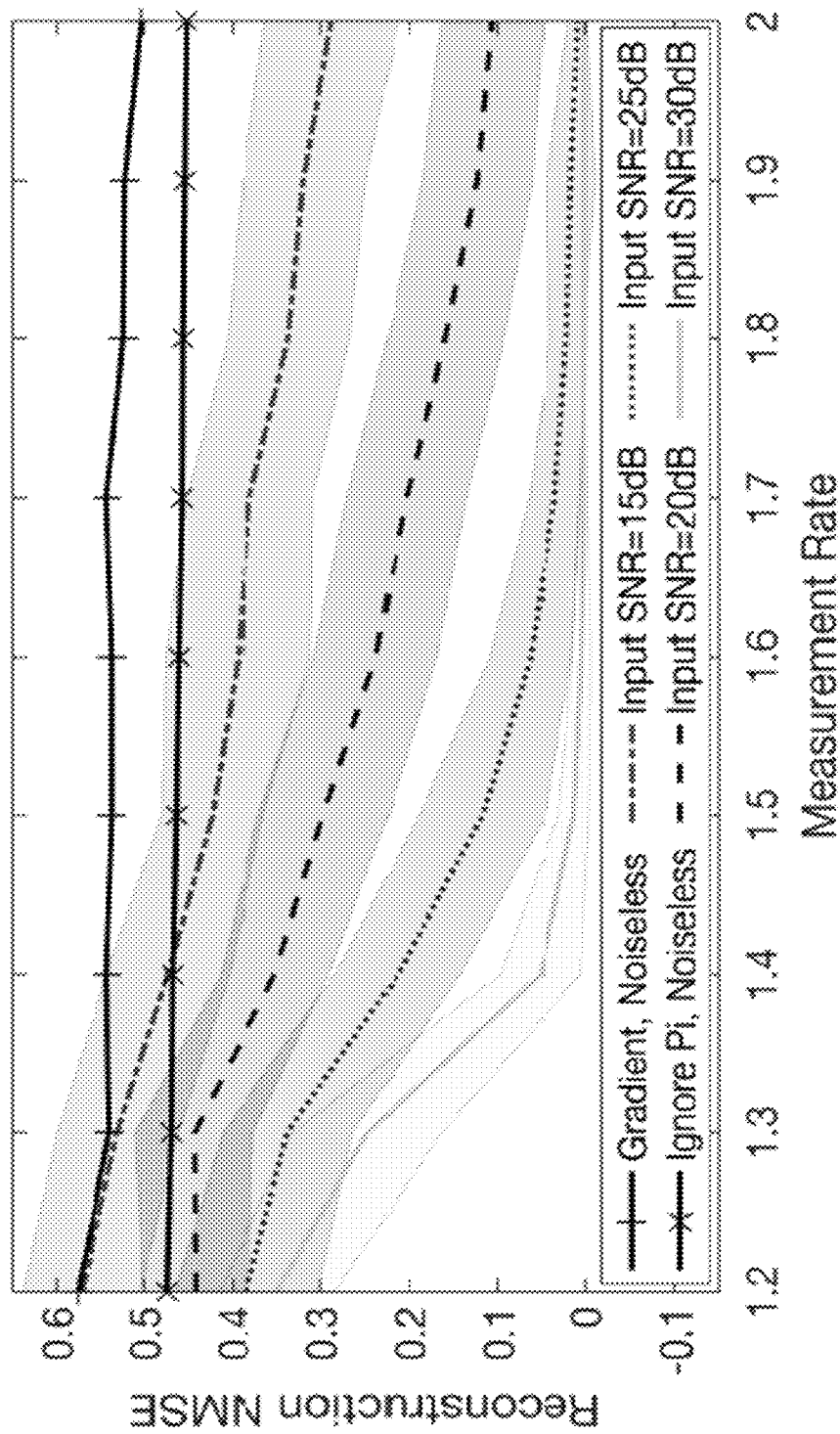
Figure 12B:
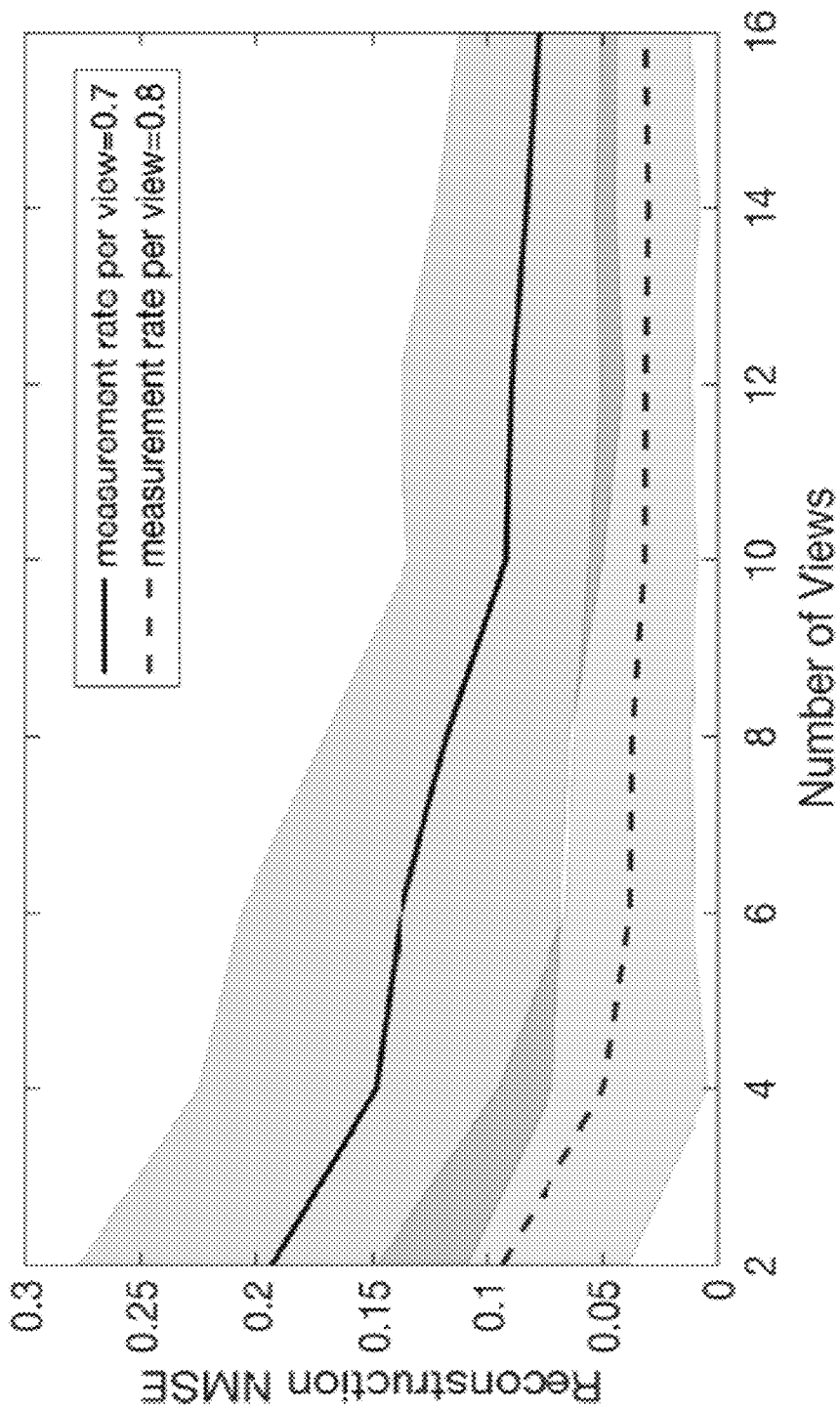
Figure 13:
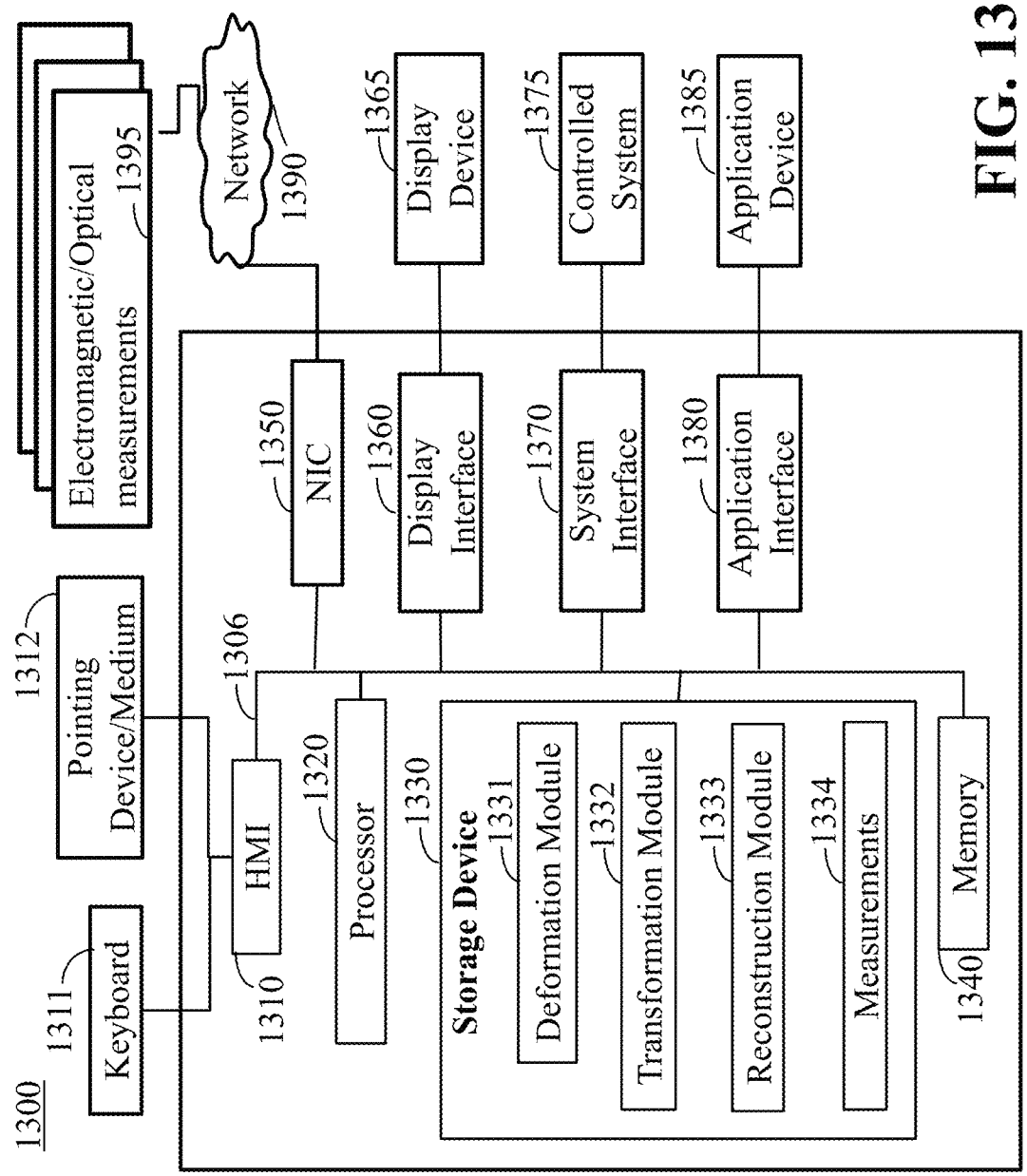
Figure 14:
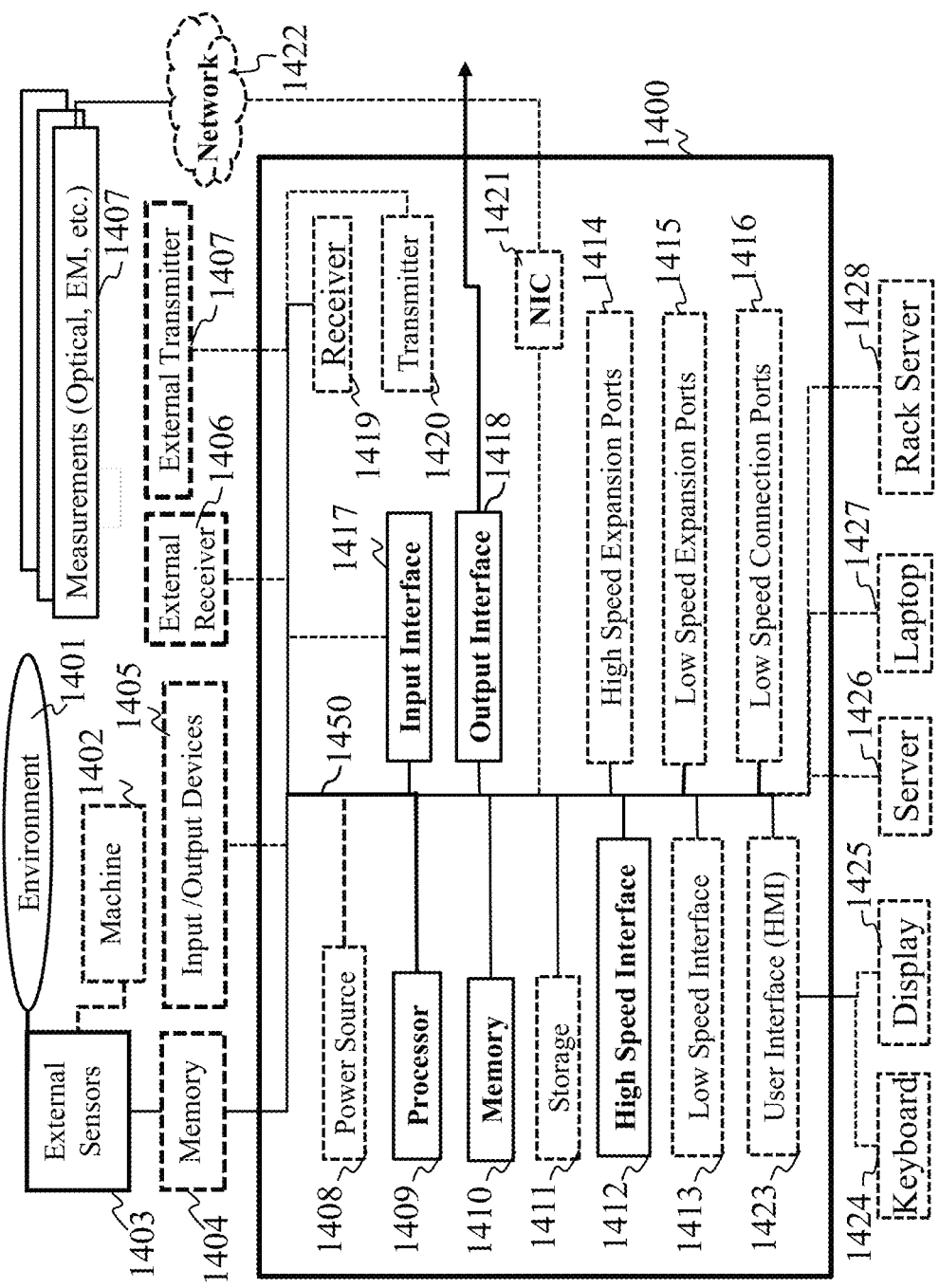

E show actual deformations $x_i = P_i F_i x$ of x observed by the acquisition system, according to some embodiments of the present disclosure;

FIG. 12A and FIG. 12B show performance analysis of some embodiments for various experimental conditions and comparisons with conventional aspects for the experimental example in FIG. 11A to FIG. 11E, according to some embodiments of the present disclosure;

FIG. 13 shows a hardware diagram of different components of the radar imaging system, according to some embodiments of the present disclosure; and FIG. 14 is a schematic illustrating a computing apparatus that can be used to implement some techniques of the methods and systems, according to some embodiments of the present disclosure.

DETAILED DESCRIPTION

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

Figure 1A:
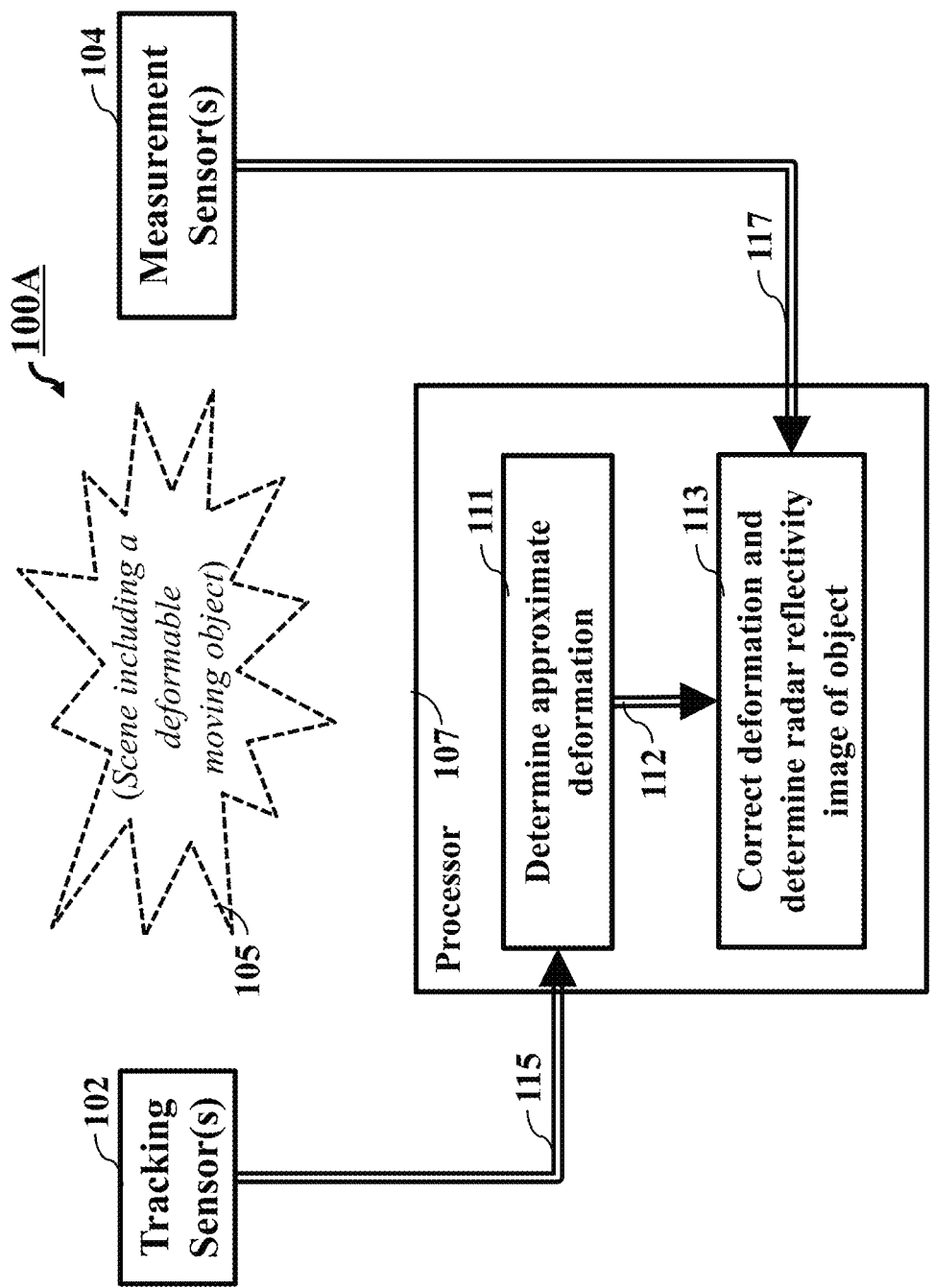
FIG. 1A is a schematic illustrating of a radar imaging system to determine a radar reflectivity image of an object moving within a scene, according to an embodiment of the present disclosure.

FIG. 1A is a schematic illustrating of an imaging system 100A to determine a reflectivity image of an object moving within a scene 105, according to an embodiment of the present disclosure. The imaging system 100A can include at least one tracking sensor 102, such as an optical or an ultrasonic sensor, configured to acquire optical reflectivity images of the scene 105 and at least one measurement sensor 104, configured to acquire measurements of the scene 105. Examples of the tracking sensor 102 include one or combination of an optical camera, a depth camera, an infrared camera, and an ultrasonic sensor. Examples of the measurement sensor 104 include one or combination of a millimeter wave (mmWave) radar, a terahertz (Thz) imaging sensor, a backscatter X-ray, magnetic resonance imaging, and a tomographic X-ray sensor.

The tracking sensor 102 can be configured to track the object in the scene 105 over multiple time steps in a period of time to produce, for each of the multiple time steps, a shape of the object at a current time step. In various embodiments, the tracking sensor 102 can determine the shape of the object as an inexact deformation 115 of a nominal shape of the object, wherein the deformation is inexact because it may contain tracking errors, or might not exhibit the tracking resolution necessary to reconstruct the object in the modality of the measurement sensor, using the measurements of the measurement sensor. For example, the nominal shape of the object may be a shape of the object arranged in a prototypical pose typically known in advance. In other embodiments the tracking sensor 102 can determine the shape of the object in one-time step as an inexact deformation 115 of a shape of the object in a different time step, wherein the deformation is inexact because it may contain tracking errors, or might not exhibit the tracking resolution necessary to reconstruct the object in the modality of the measurement sensor, using the measurements of the measurement sensor.

Still referring to FIG. 1A, the measurement sensor 104 can be configured to acquire snapshots of the scene 105 over the multiple time steps within the time period to produce a set of measurements 117 of the object with deformed shapes defined by corresponding deformations of the shape of the object determined by the tracking sensor 102. Notably, due to the movement of the object in the scene 105, at least two different measurement snapshots can include the object with different deformed shapes.

The imaging system 100A can include at least one processor 107. The processor 107 can be configured to determine 111, for each snapshot in each time step of the multiple time steps, a correction of the deformation 115 determined for the corresponding time step, which incorporates the measurements of the scene at the time step, to produce an accurate deformation using embodiments of the present disclosure. The processor may further be configured to determine the image of the object in the modality of the measurement sensor, under a particular deformation, incorporating the correction of the deformation in one or more time-steps and the measurement snapshots in one or more time-steps.

Still referring to FIG. 1A, because the object is moving in the scene 105, different measurement snapshots can be obtained from different transformations for each time step of the multiple time steps. In some embodiments, the tracking and the measurement snapshots can be synchronized, e.g., taken concurrently at corresponding time steps and/or with a predetermined time shift, such that the image of the object is determined using the deformation produced by the corresponding tracking sensor, synchronized or acquired at the same time step.

In some embodiments, the tracking and the measurement sensor may be the same sensor, wherein the processor 107 is further configured to determine the inexact deformation before computing a correction. In other embodiments, the tracking sensor may or may not be the same sensor as the measurement sensor, and the processor directly computes an accurate deformation incorporating tracking snapshots in one or more time steps and the measurement snapshots in one or more time steps.

Still referring to FIG. 1A, in some embodiments, the processor may further incorporate other available information in determining the inexact and the accurate deformation for each time step. This information may include, but it not limited to:

i) the position of the sensor system at the time of each snapshot;
ii) the orientation and field of view of each of the sensors at each time step;
iii) prior measurements of the scene or knowledge of the scene geometry from existing sources, such as maps and wireframe representation and images,
iv) dynamic information of the object deformation, such as heart rate and beating models, lung breathing rate and deformation models, etc.;
v) odometry of the platform on which the sensor is mounted if the sensor is mobile, including velocity, acceleration, pitch, yaw, and kinematic motion models;
vi) pre-determined reflectivity patterns or marking, such as QR codes, corner reflectors, or motion capture markers;
vii) pre-existing sensor landmarks in the scene and their exact geometry, along with any other information that may assist the processor in determining a deformation of the object Still referring to FIG. 1A, some embodiments can be based on recognition that an imaging system can jointly use the measurements of a scene acquired over multiple time steps. Such a system of measurements can be used to improve the resolution of the measured image beyond a resolution governed by the size of the imaging system, known in the art as aperture size. When the object is moving or deforming over time, at different time steps, the object can be located at a different position and can have a different shape caused by the non-rigid motion. Such a dislocation and deformation of the object make the system of measurements ambiguous, i.e., ill-posed, and difficult or impractical to solve. However, the embodiments can, instead, exploit the diversity introduced by the motion by determining and using the transformations between each measurement snapshot to construct a larger synthetic aperture, which allows for higher effective resolution. This in known in the art as inverse synthetic aperture imaging (ISAR). However, the methods in the art are not able to incorporate deformable objects in the tracking.

Some embodiments of the present disclosure provide ISAR for deformable objects. Thus, the embodiments can jointly use measurements of a scene acquired over multiple time steps to produce the image of the object in one or more specific poses or deformation. For example, the image of a human may be reproduced as the human is walking through the system or in a pose wherein all parts of the human body are visible and not occluded. As another example, an image of a beating heart or lungs may be reproduced at a predetermined phase of the beating or the breathing pattern.

Still referring to FIG. 1A, some embodiments are based on recognition that at least one reason for using separate sensors of to measure and to track a moving object can be due to a resolution of the measurement sensor which is governed by a physical size of the antennas of the sensors. Specifically, for practical reasons, the size of the antennas of an imaging system can allow the estimation of only a coarse image of the object at each time step. Such a coarse image can be suitable to track an object subject to rigid and finite transformation; however, this type of component configuration can fail to recognize arbitrarily non-rigid transformation typical for the motion of a human.

Some embodiments are based on recognition that other sensors, such as optical monochrome or color or infrared video cameras, or depth cameras, or ultrasonic sensors, or a combination thereof, are cheaper than the measurement sensor with comparable resolution and also more suitable for tracking. Hence, a tracking sensor can be used for tracking the motion of the target, even if the target is deformable and the motion is not rigid. On the other hand, tracking sensors, using a different modality than the measurement sensors, might not be able to provide the information or the resolution necessary for the function of the sensing system. For example, optical sensors are not able to see covered objects, and, thus are not able to detect dangerous weapons or contraband in a security screening application, even though they can be used to track a human moving through the system. Similarly, ultrasonic sensors are very inexpensive and are able to detect and track a beating heart or a lung breathing pattern. However, they are not sufficiently precise to image the beating heart or the lung with the same resolution and fidelity as an MRI or CAT system.

Some embodiments are based on realization that for a number of applications, it is sufficient to determine a radar reflectivity image of an object at some prototypical pose, not necessarily at a current pose that object has at a current instance of time. For example, for some security applications, the prototypical pose of a person is standing, with the hands extended upwards or sideways. The object arranged in the prototypical pose has a nominal shape that can change, i.e., deform, as the object moves.

Still referring to FIG. 1A, some embodiments are based on another realization that the optical sensor can track the object in the scene using the relative deformation to the previous pose, rather than the deformation from a common, prototypical pose. For example, instead of determining a pose and/or an absolute current shape of the object in the current snapshot of the scene, the optical sensor can determine the relative shape of the object as a deformation a shape of the object in another snapshot. The embodiments are based on realization that the deformation of the nominal shape of the object determined by the tracking sensor can be used to reconstruct the image of the object in some pose.

Figure 1B:
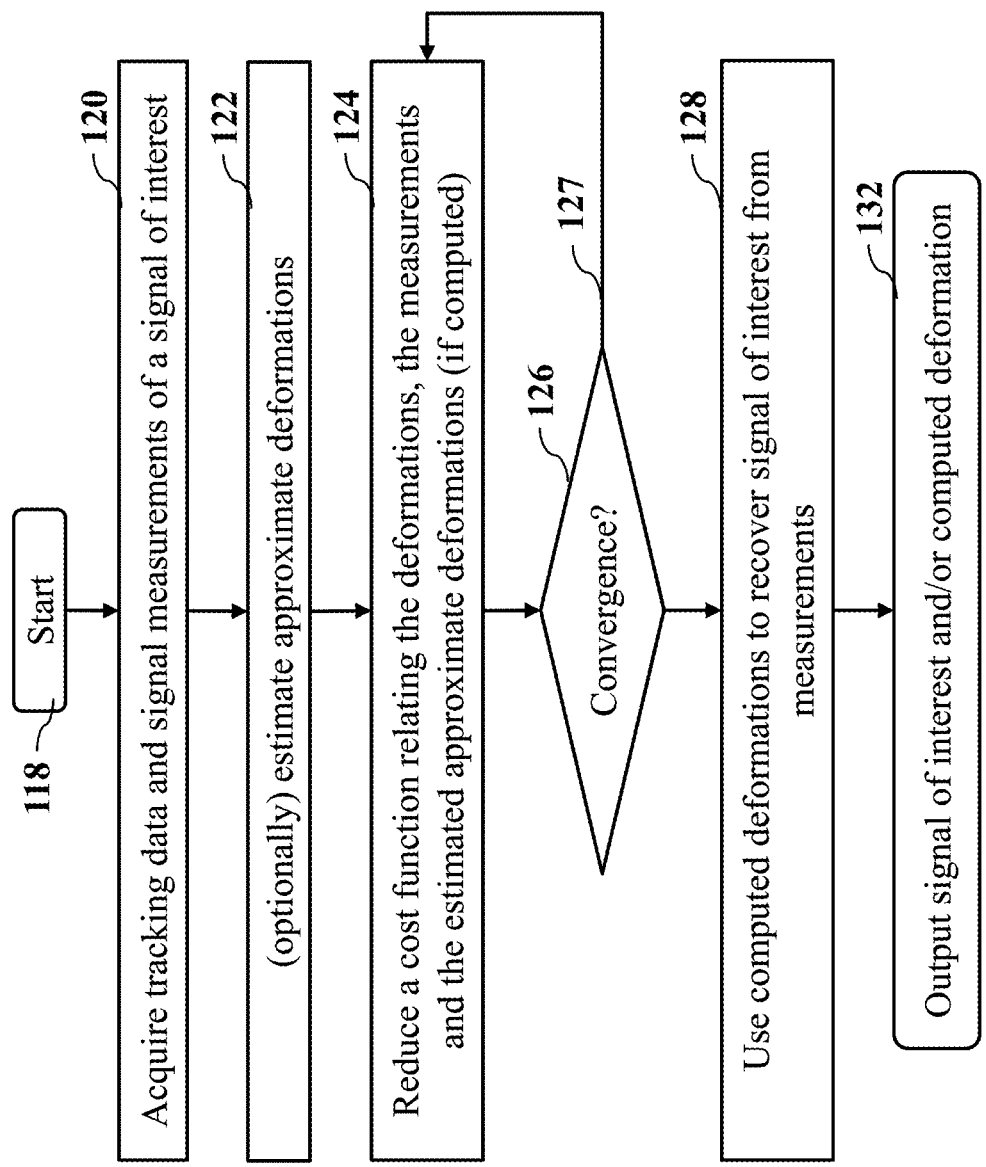
FIG. 1B is a flow diagram illustrating some method steps for implementing a method, according to some embodiments of the present disclosure.

FIG. 1B is a flow diagram illustrating some method steps for implementing a method, according to some embodiments of the present disclosure. The method starts 118 and obtains multiple snapshots of a signal of interest 120, which include a subset or a combination of tracking data and measurements of the signal of interest that can be used to reconstruct an image of the signal of interest. The signal of interest may include a specific object fully or partially in the field of view of the sensors, a scene, or a combination thereof, that has undergone a deformation in each of the snapshots.

In some embodiments, if possible by the available tracking data and measurements, an estimate of the approximate deformation of the signal of interest in each of the snapshot is computed 122, using methods known in the art. A cost function 124, relating, among other possibly available information, the true deformation of the signal of interest, the approximate estimate of the deformation, the signal of interest, the measurements of the signal of interest and the tracking data, is reduced iteratively 127, until convergence 126, as described below.

If required, in some embodiments, the computed deformations are used to reconstruct the signal of interest 128. The signal of interest or the computed deformations, or both are output 132 by the method, as required by the application and further processing steps.

Still referring to FIG. 1B, Contemplated is that some steps of a radar method to estimate a deformation of a deformable object moving in a scene that can include steps of, for example, tracking a deforming object within the scene over multiple time steps for a period of time via a tracking system with a tracking sensor to estimate a deformation of the object for each time step. A step of using an electromagnetic sensor(s) that captures measurements of the object deforming in the scene over the multiple time steps for the time period as measurement data, by capturing snapshots of the object moving over the multiple time steps. Another step using a processor that calculates, for the measurement data, deformation information of the deforming object. Which can include the electromagnetic sensor that captures snapshots of the object deforming over the multiple time steps. Each acquired snapshot of the object in the measurement data includes measurements of the object in a deformation for that time step, to produce a set of measurements of the object with deformed shapes over the multiple time steps. Wherein, for each time step for the multiple time steps, the processor sequentially calculates deformation information of object, by computing a correction to the estimates of the deformation of the object for each time step for the multiple time steps.

A step where the correction can include matching measurements of the corrected deformation of the object for each time step to measurements in the acquired snapshot of the object for that time step. Wherein, for each time step, select a corrected deformation over other corrected deformations for that time step, according to a distance between the corrected deformation and the initial estimate of the deformation, to obtain a final estimate of the deformation of the deformable object moving in the scene and a final image of the object moving within the scene.

Depending upon a user or operator's specific goals, a step can include output the final estimate of the deformation of the deformable object to one or more components of at least one output of the radar system or to another system associated with the radar system.

Figure 2A:
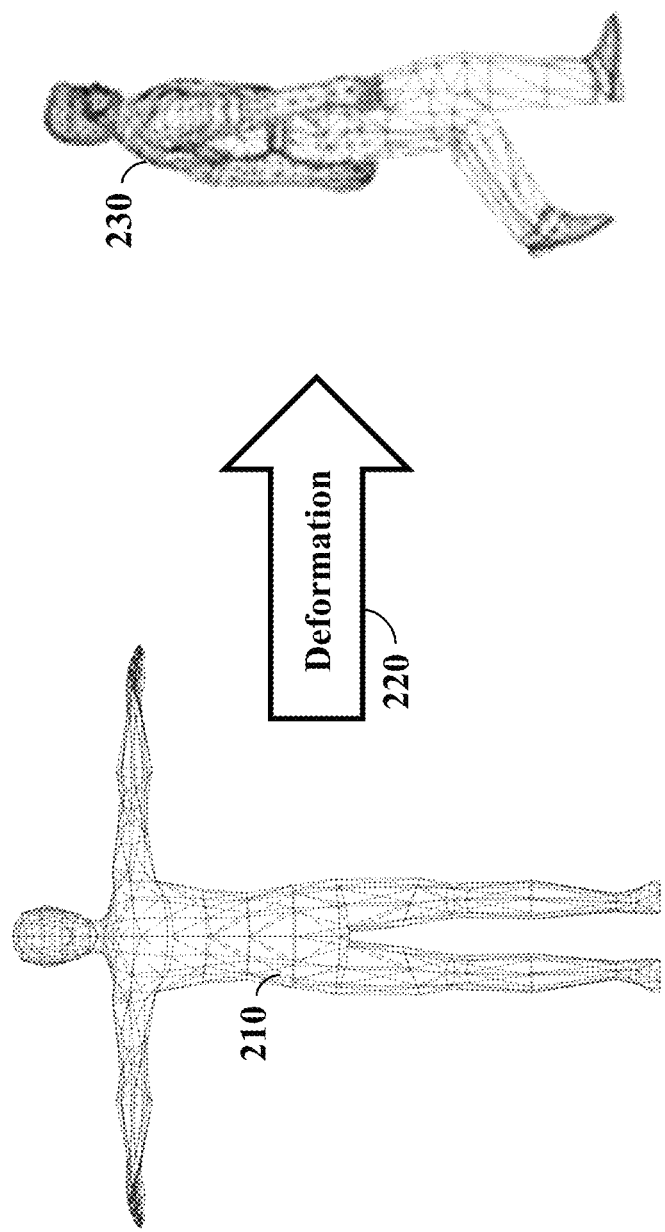
FIG. 2A is a schematic illustrating deformation of the object being imaged, according to some embodiments of the present disclosure.

FIG. 2A is a schematic illustrating relative tracking utilizing at least one measurement device such as an optical sensor, according to some embodiments of the present disclosure. For example, some embodiments can track a moving object, e.g., a person, by determining at each time instant or time step, a deformation 220 of a nominal shape 210 of the object resulting in a deformed shape 230 of the object.

Some embodiments are based on a realization that the deformation 220 indicative of a transformation of an object in a tracking modality is also indicative of the transformation of the object in the measurement modality, even if the two modalities are different. Therefore, an approximate deformation can be computed from the tracking sensor output.

Figure 2B:
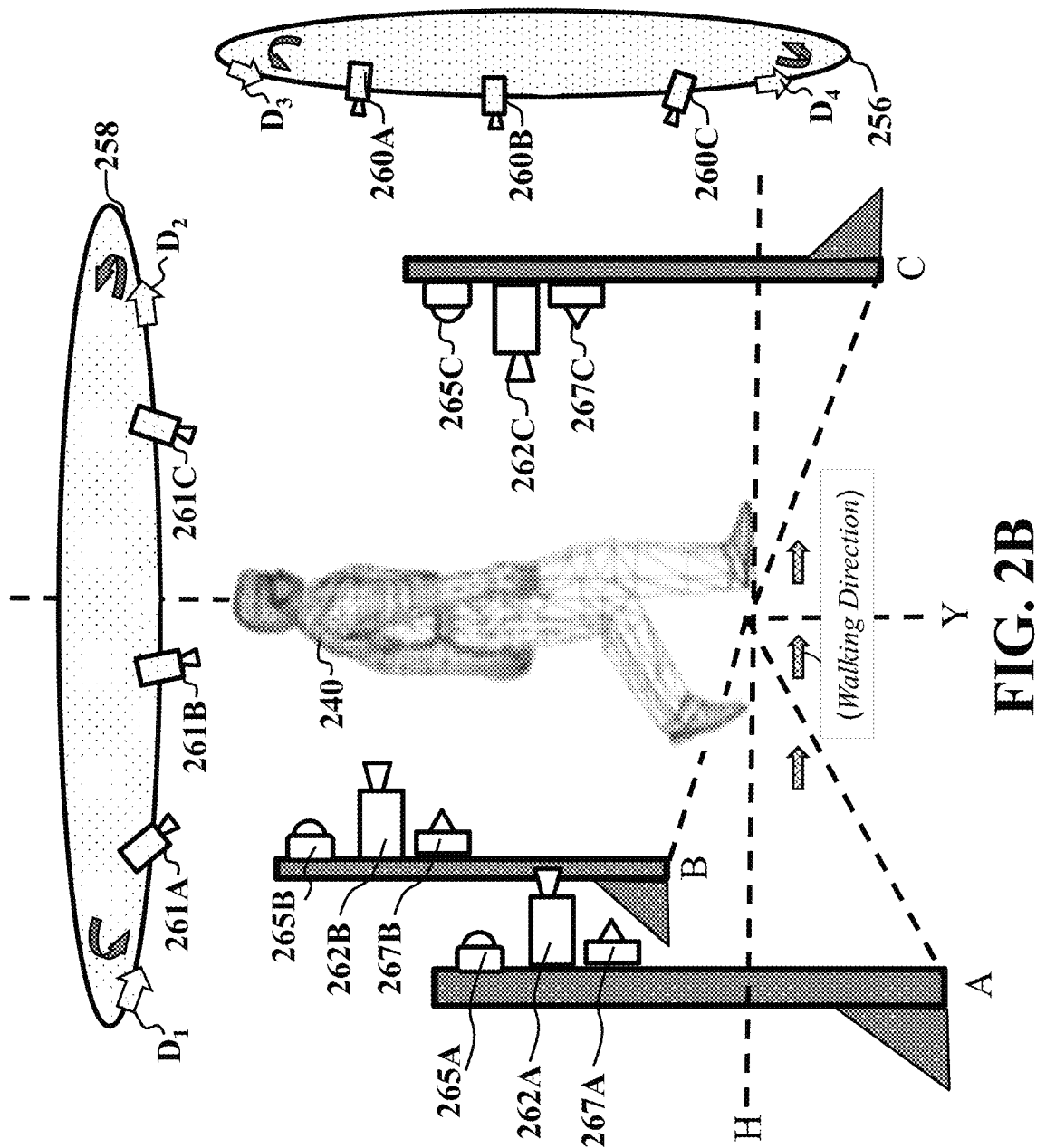
FIG. 2B is a schematic illustrating some components that can be utilized with a radar imaging system, according to some embodiments of the present disclosure.

FIG. 2B is a schematic illustrating some components that can be utilized with a radar imaging system, according to some embodiments of the present disclosure. For example, an object 240 can be person walking or moving relative to a sensor configuration, in which, the person 240 can be imaged by measurement sensors. Some types of measurement sensors can include radar, mmWave, backscatter X-ray or THz sensors 260A-260C, 261A-261C, 262A-262C, which for each time step can take snapshots in order to generate an image of the person in some pose, which may be a three-dimensional (3D) image, wherein the pose may be a pose of the person in one of the time steps or a pose the person never used, such as a prototypical pose with the arms out and stretched so that all sides of the body are visible.

Some types of tracking sensors may include optical and depth sensors 265A-265C that may additionally detect a three-dimensional 3D model of the object 240, i.e. person, in order to track the deformations of the person as it moves through the imaging system. For example, tracking the deformation of the object may include determining the position and orientation of each part of the person's body, such as the arms and legs, relative to the imaging system. It may also include using a wireframe model of the body and, for an acquired snapshot, determining the location within the sensing system of every point of the wireframe model and/or a determination whether that point is occluded to the camera at the time step of that snapshot. Tracking the deformation of the body may also include mapping pixels or voxels from one snapshot to another, such that pixels from one snapshot mapped to pixels from another snapshot correspond to the same part of the body as it has moved between the two snapshots.

Still referring to FIG. 2B, operationally, the measurement sensors of the sensor configuration generate data to be sent to a hardware processor, such as the hardware processor 107 of FIG. 1A to be processed. The person 240 moves relative to the sensor configuration, where, for example, a transmitter of the measurement sensors 260A-260C, 261A-261C, 262A-262C may emit continuously or in pulses, a transmission signal. The waves of the transmission signal are reflected on the person or object 240, and are detected by a receiving sensor. Some measurement sensors may be passive, i.e., only have receiving sensors. The signal is digitized and routed to the hardware processor, i.e. for example the processor 107 of FIG. 1A. In respect to the sensor configuration, other embodiments are contemplated including more sensors, different combination of types of sensors and even combinations of types of radar systems. Depending upon a user specific goals and sensor configuration requirements other components can include higher performance components provided in FIG. 13 and FIG. 14. The different types of sensors of the sensor configuration can be synchronized with sufficiently high accuracy so that they work coherently together. Each receiving unit can be equipped with a receiving channel and analog-to-digital conversion systems.

Rotating or otherwise mobile structures 256, 258 may be configured with different types of sensors in order to address specific user goals and application requirements. As an example, these rotating structures can rotate in a clockwise direction D1, D2, D3, D4, or a counter clockwise direction (not shown), depending upon the user specific requirements. Also, the rotating structures 256, 258 may be placed on rails to either increase or decrease the rotating structure height (not shown), or even travel on rails (not shown) along an horizontal axis H and/or y axis Y. Some aspects as to why the sensor configuration can include multiple movement characteristics can be associate with user's specific application requirements. For example, a user may utilize the sensor configuration for security related applications including airport, building, etc. to identify potential weapons, and the like. Wherein a 360° imaging of the object is less expensive with the measuring sensors positioned on the rotating structures 256, 258, as it requires fewer sensors. Contemplated is that other types of sensors, i.e. audio, temperature, humidity, etc., along with lighting, can be mounted on the rotating structures 256, 258 and the other structures A, B, C. Some benefits of using the rotating structures 256, 258 can include a larger target area that can be covered by the measuring sensors and a larger effective aperture, which provide a higher resolution image.

Figure 2C:
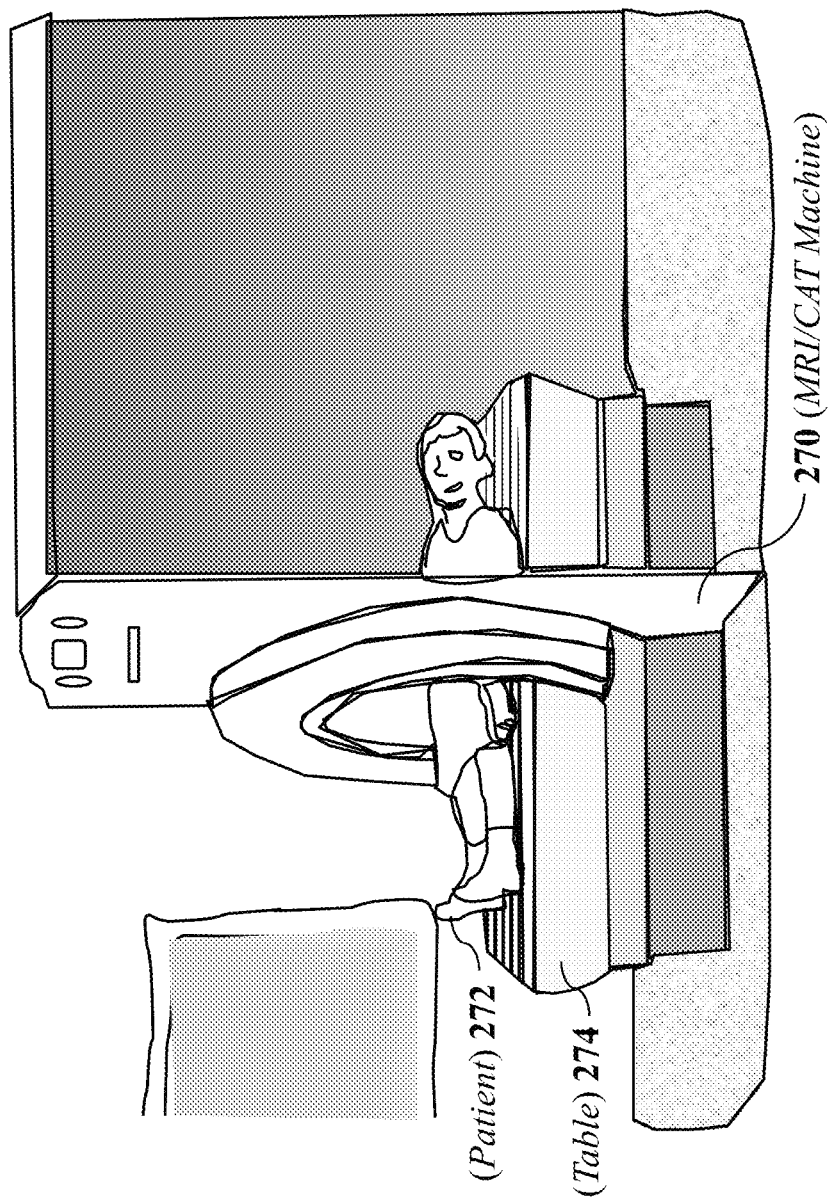
FIG. 2C is a schematic illustrating an MRI machine utilized with a radar imaging system to scan a person, according to some embodiments of the present disclosure.

FIG. 2C is a schematic illustrating a MRI or a CAT machine 270 utilized as an imaging system to scan a patient/person 272 on a table 274, according to some embodiments of the present disclosure. MRI or CAT machines are used to image the internal structure of the body to detect medical conditions and assist physicians' diagnoses. The machine takes multiple snapshots of the body being imaged under different angles, thus creating a synthetic aperture imaging the area of interest inside the body.

To ensure that synthetic aperture imaging reconstructs the correct image, without blurring or motion artifacts, the patient should be kept as still as possible during imaging. This is a problem, especially when imaging moving and deforming organs, such as the heart or the lung. In such applications, embodiments of the present disclosure may use one or more tracking sensors, which may include but not limited to an ultrasonic sensor, a heart rate monitor, or a breathing rate sensor, among others.

Still referring to FIG. 2C, as the organ being imaged moves and deforms during imaging, the tracking sensor estimates an inexact deformation of the organ for each of the snapshot taken by the measurement system. Using some embodiments of present disclosure it is, thus possible to determine an image of the organ under any deformation, even though each snapshot is taken in a different deformation. Using some embodiments of the present disclosure, the processor 107 in FIG. 1A determines a correction of the inexact deformation and an image of the organ in the imaging modality, considering the measurements for each snapshot, as described in the present disclosure.

Figure 3:
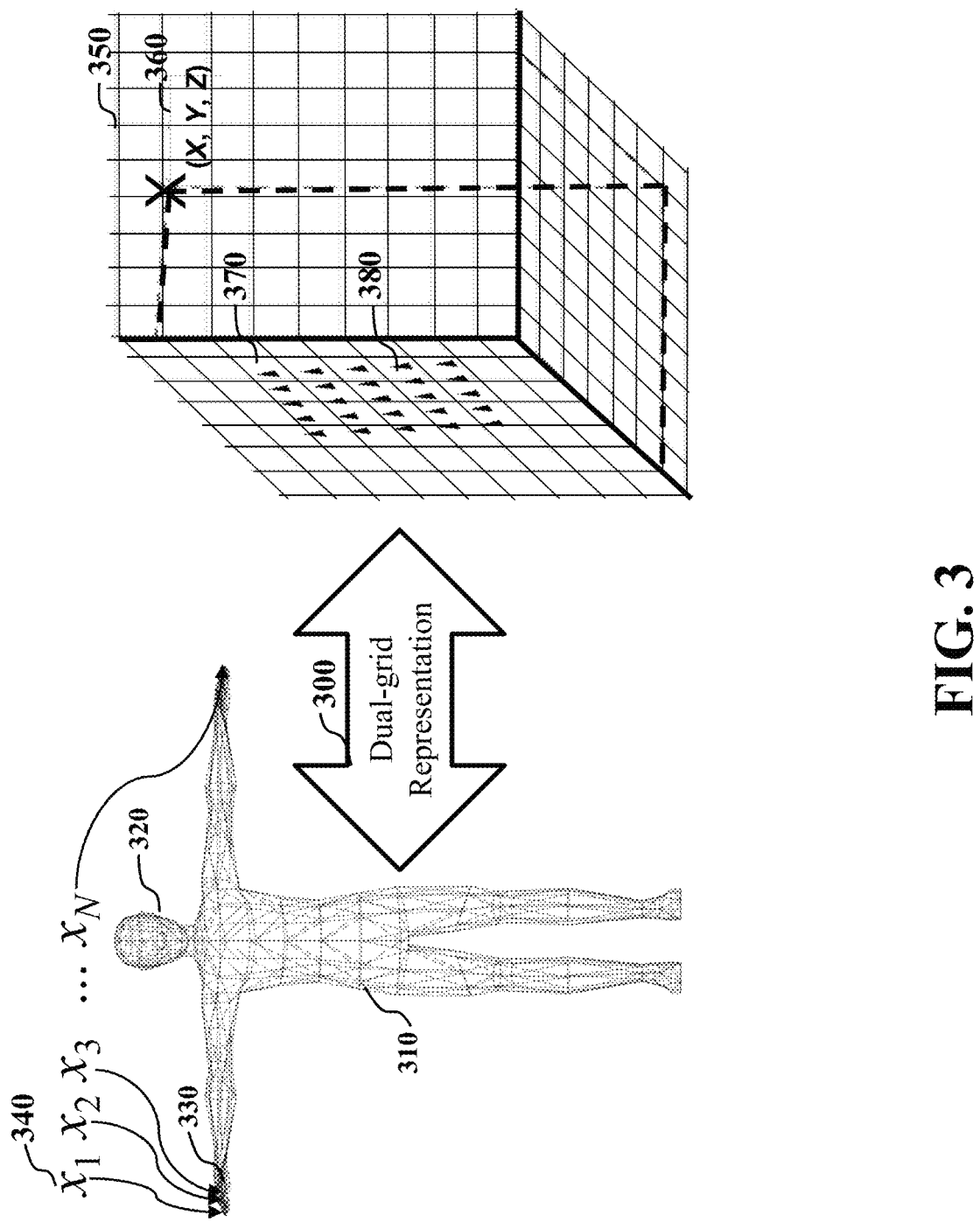
FIG. 3 is a schematic illustrating of dual-grid representation of an object, according to some embodiments of the present disclosure.

FIG. 3 is a schematic illustrating of dual-grid representation of an object, according to some embodiments of the present disclosure. For example, a deformable object 310, a human in this example, is in a prototypical pose. To construct a radar reflectivity image in the prototypical form, a grid 320 can be defined on the prototypical pose of the object. In other words, the first grid 320 of the dual-grid representation is a prototypical grid that discretizes the object itself. For example, the grid in the image has grid positions 330 indexed as 1, 2, . . . , N. The radar reflectivity of each point in the grid 340 is denoted as $x_1, x_2, \ldots, x_N$. There are several ways to index the prototypical grid, but in general they can always be mapped to a sequential grid, as shown in the figure. Any grid indexing approach can be used in embodiments of the present disclosure.

The second grid of the dual-grid representation is a radar grid that discretizes the scene itself. For example, in one embodiment the second grid is a rectangular (Cartesian) grid 550. However, other grids, such as a radial one may also be used by different embodiments. As with the prototypical grid, there are several ways to index the radar grid used by different embodiments. For example, in the embodiment shown in FIG. 3, the radar grid is indexed using Cartesian coordinates 360. The measurement sensor, e.g., radar 370, and/or individual radar transceivers 380 have positions inside the radar grid, at known locations.

Still referring to FIG. 3, in some embodiments, both grids in the dual-grid representation are the same, e.g., they are both cartesian grids. This representation is particularly useful when the deformation is determined as a deformation of the pose of the object between two snapshots, since the representation of the first grid corresponds to the grid of the first snapshot and the representation of the second grid corresponds to the grid of the second snapshot.

Figure 4:
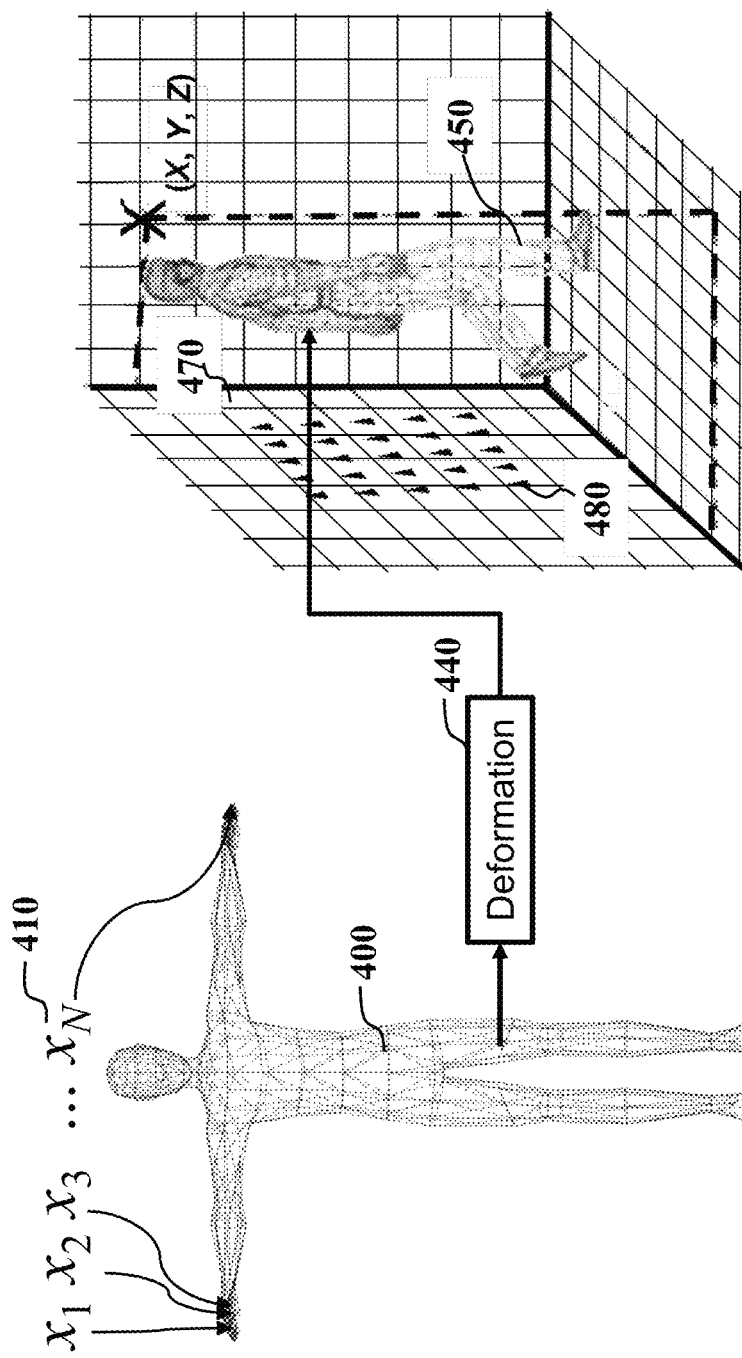
FIG. 4 shows a schematic capturing the motion of the object using the dual-grid representation, according to some embodiments of the present disclosure.

FIG. 4 shows a schematic capturing the deformation of the object using the dual-grid representation, according to some embodiments of the present disclosure. FIG. 4 illustrates the object in the pose at the first grid 400, as well as the object's pose in the second grid in front of the measurement sensor in a single snapshot 450. The object's pose in front of the measurement sensor can be described by a deformation 440 of the object in the first grid to represent the deformation of the object in the second grid. The object in the second grid is observed by the measurement sensor, e.g., a radar, 470 and its individual transceivers 480 according to a measurement operator related to the hardware of the measurement sensor. As described above, the deformation of the radar grid may be inferred by the tracking sensor, which might be the same as the measurement sensor, or a tracking model or other information.

Figure 5:
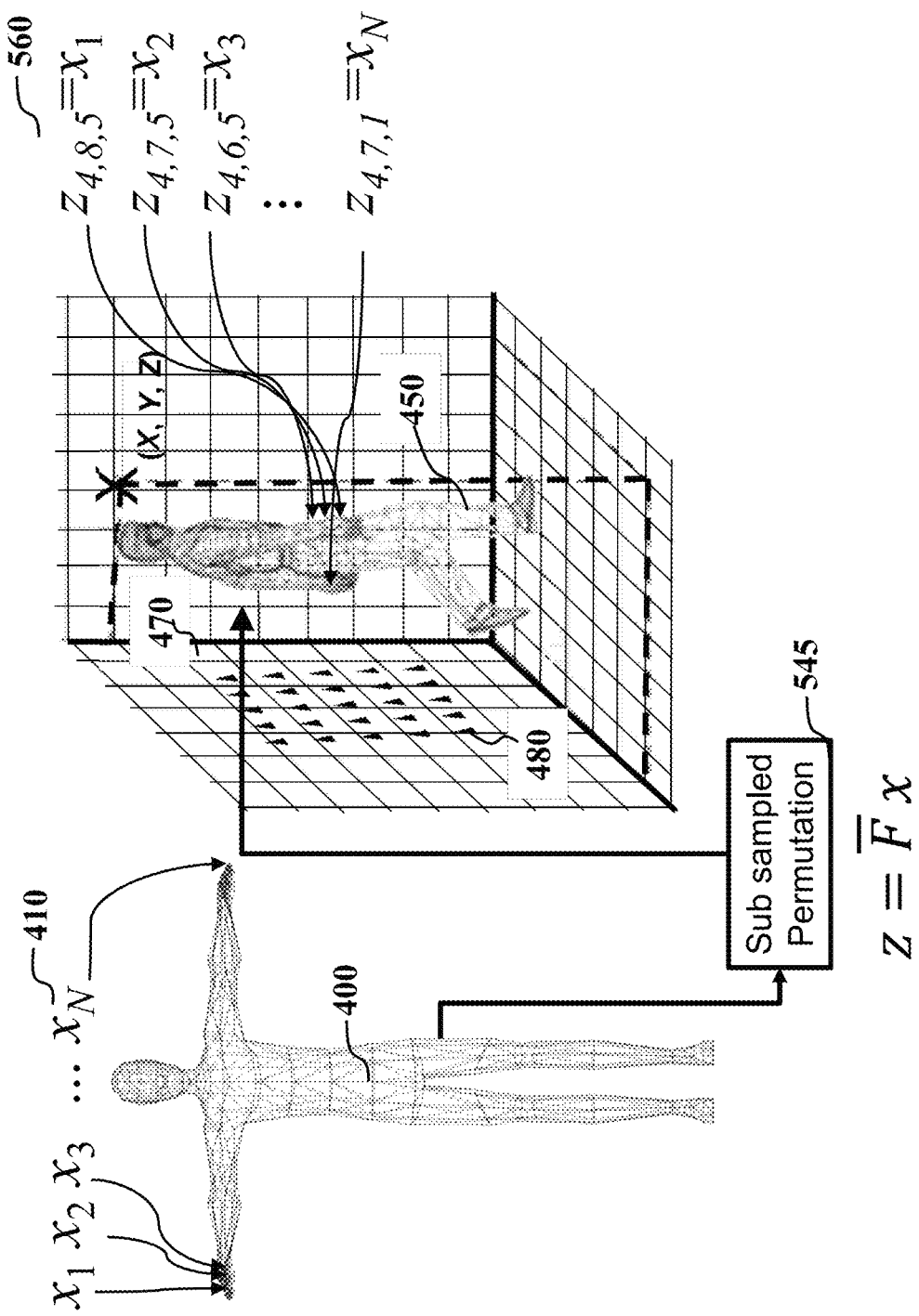
FIG. 5 shows a schematic capturing the transformation of the object caused by its motion using the dual-grid representation, according to some embodiments of the present disclosure.

FIG. 5 shows a schematic capturing the transformation of the object caused by its motion using the dual-grid representation, according to some embodiments of the present disclosure. This embodiment determines each transformation as a subsampled permutation that permutes locations of some points of the image of the object in the first grid and removes different points of the image of the object in the first grid, in dependence of the deformation of the nominal shape of the object in the first grid.

Referring to FIG. 4 and FIG. 5, specifically, the deformation is a subsampled coordinate permutation 545 of FIG. 5, i.e., a transformation that maps the indices in the coordinate system of the first grid to the indices of the second grid. Thus, the image of the object measured by the measurement sensor is a simple permutation with erasures that maps 560 of FIG. 5 the image of the object in the first grid 410 of FIG. 4 to the image of the object in the second grid, consistent with the object's pose.

Still referring to FIG. 5, more generally, in some embodiments, the image of the deformed object in the second grid is a linear transformation of the image of the object in the prototypical pose, that can be described as $$z = \bar{F}x, \qquad (1)$$

where x is the image of the object in the pose in the first grid and z is the image of the deformed object in the radar grid.

Figure 6:
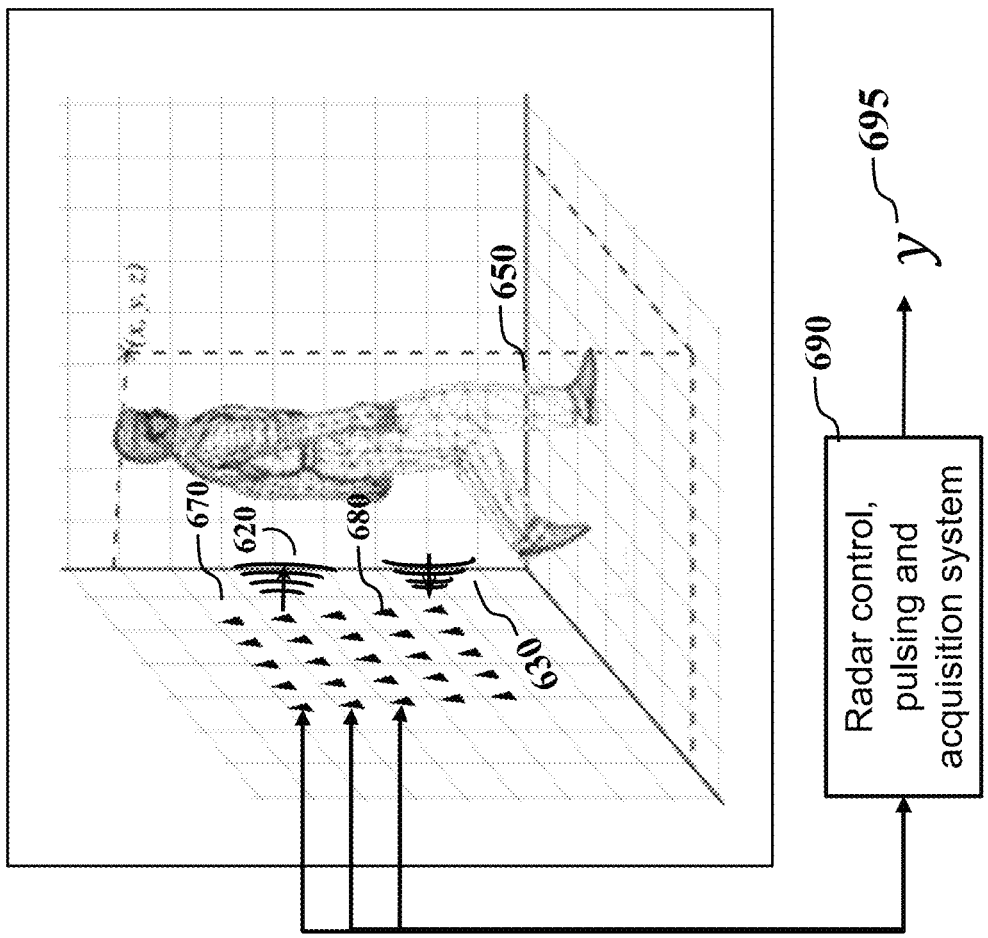
FIG. 6 shows a schematic of an electromagnetic sensor, such as a radar, acquiring the radar reflectivity image, according to some embodiments of the present disclosure.

FIG. 6 shows a schematic of a measurement sensor, using a radar as an example, acquiring the radar reflectivity image, according to some embodiments of the present disclosure. The sensor 670 includes transceivers 680 (or separate transmitters and receivers) which are used to sense the scene. In particular, one or more of the transceivers transmit a pulse 620 or otherwise excite the scene. The pulses are absorbed by or reflect back from the object 650, according to the reflectivity of the object. The reflected pulses 630 are acquired by one or more transceivers 680. The pulse transmission and acquisition, is controlled by a radar control, pulsing and acquisition system 690, which may control the pulse shape and timing, as well as which transceivers transmit and which receive. In some modalities, such as MRI, instead of reflecting, the excited object might generate its own signal, such as a resonance according to the response properties of the object. In general, these response properties, which may include a reflectivity, comprise the image of the object.

The system is configured for acquiring the signals that the receivers receive in response to the received pulses from the scene, for example, using a data acquisition system. A data acquisition system may include one or more amplifiers, one or more modulators, and one or more analog-to-digital converters, among others. The system outputs data y 695 which represent recordings of the pulse reflections. These recordings are samples of the reflections or a function of them, such as demodulation, filtering, de-chirping, or other pre-processing functions known in the art. This data comprises the measurements of the scene in each snapshot.

Still referring to FIG. 6, the acquired data y are linear measurements of z, the radar reflectivity image of the deformed object 650 in the radar scene, through the radar acquisition function, also known in the art as the forward operator denoted here using A. Thus, the acquired data for a single snapshot are equal to $$y = Az = A\bar{F}x. \qquad (2)$$

If the radar system has a sufficient number of sensors and a big aperture, then the data y may be sufficient to recover z, the radar reflectivity image of the object in the deformed pose. However, recovering the image in high resolution would require a large and expensive radar array. Furthermore, in particular deformations, parts of the object might not be visible to the array, which can make their radar reflectivity not recoverable, irrespective of the radar array size.

Still referring to FIG. 6, for that reason, an imaging system of some embodiments acquire measurements of several snapshots of the image, under different deformations $$y_i = A_i z_i = A_i \bar{F}_i x, \qquad (3)$$

where i=1, . . . , T is the index of the snapshot, and T is the total number of snapshots. In various embodiments, the only change between snapshots is the deformation of the object, and, therefore, the deformation $\bar{F}_i$ of the radar reflectivity image. In some embodiments, the measurement operator can be different when, for example, different transducers are used to acquire each snapshot, or the sensor moves or rotates on a moving platform. In other embodiments the forward operator is always the same in each snapshot, in which case $A_i=A$ for all i.

If all the deformations are perfectly known, the image of the object can be reconstructed by combining the measurements of images of the object with deformed shapes transformed with the corresponding transformations. For example, using multiple snapshots, the reconstruction problem becomes one of recovering x from $$\begin{bmatrix} y_1 \\ \vdots \\ y_T \end{bmatrix} = \begin{bmatrix} A_1 F_1 \\ \vdots \\ A_T F_T \end{bmatrix} x, \quad (4)$$

which, assuming the $F_i$ are known, can be performed using, e.g., least squares inversion. Solutions of (4) in the art may impose additional regularization constraints on reconstructing image x, such as sparsity or smoothness, by expressing x in some lower-dimensional basis of a subspace or a large dictionary, i.e., x=Bh, where B is a low dimensional basis or a dictionary, and h is a set of coefficients either lower-dimensional than x or sparse. Alternatively, or additionally, other solutions in the art may impose low total variation structure on x, i.e., sparsity in its gradient. All these regularization constraints can be imposed by regularizing using different techniques.

Still referring to FIG. 6, some embodiments determine the deformation $F_i$ of the image from the deformation of an image acquired in a different modality, such as an optical image. In other words, by using a different modality it is possible to infer the physical deformation of the object. Since the reflectivity of each point in the object's image in the measurement modality does not change with the position of the point, i.e., with the deformation of the object, the deformation inferred by the sensor of the different modality can be used to infer the deformation of the object's image in the measurement modality.

Optical sensors, such as monochrome, color, or infrared cameras record snapshots of the reflectivity of objects as they move through a scene. Using two or more of these cameras, placed at some distance apart, it is possible to determine the distance of each point of the object from each camera, known in the art as depth of the point. Similarly, depth cameras use the time-of-flight of optical pulses or structured light patterns to determine depth. By acquiring the optical reflectivity and/or the depth of the object as it moves, there are methods in the art to track the points of the object, i.e., to determine, in each snapshot, the deformation of the objects from the deformation of the optical or the depth image. Determining this deformation is possible in the art, even though the optical reflection of the object changes with deformation due to lighting, occlusion, shadowing and other effects.

Still referring to FIG. 6, thus, an optical sensor, such as a camera or a depth sensor, can be used to infer the deformation $F_i$ in each snapshot. The optical sensor acquires a snapshot of the object at the same time instance as the radar sensor acquires a snapshot of the radar reflectivity image, as described in (3). This radar reflectivity image can then be used to track the deformation of the object in order to reconstruct its radar reflectivity image. In some embodiments, the optical sensor might acquire snapshots at different time instances than the radar sensor. The deformation of the object at the time instance that the radar acquires the snapshot is can then be inferred using multiple optical snapshots, using techniques known in the art, such as interpolation or motion modeling.

Similarly, in other embodiments it is possible to infer the deformation using other tracking sensors. In some embodiments, for example, it is known in the art how to infer the deformation of an internal organ, such as a beating heart or a breathing lung using, for example, an ultrasonic sensor. In other embodiments, it is possible to infer the deformation due to the motion of the platform of the sensor using methods collectively known in the art as simultaneous localization and mapping (SLAM).

Still referring to FIG. 6, most of the time, the deformation estimated from the tracking sensor, is inexact, i.e., includes tracking errors and is of lower resolution than the resolution required for accurate image reconstruction using the measurements of the measurement sensor and (4). Some embodiments of present disclosure correct the tracking error to produce an accurate deformation and, as necessary, an accurate reconstructed image of the object.

Figure 7:
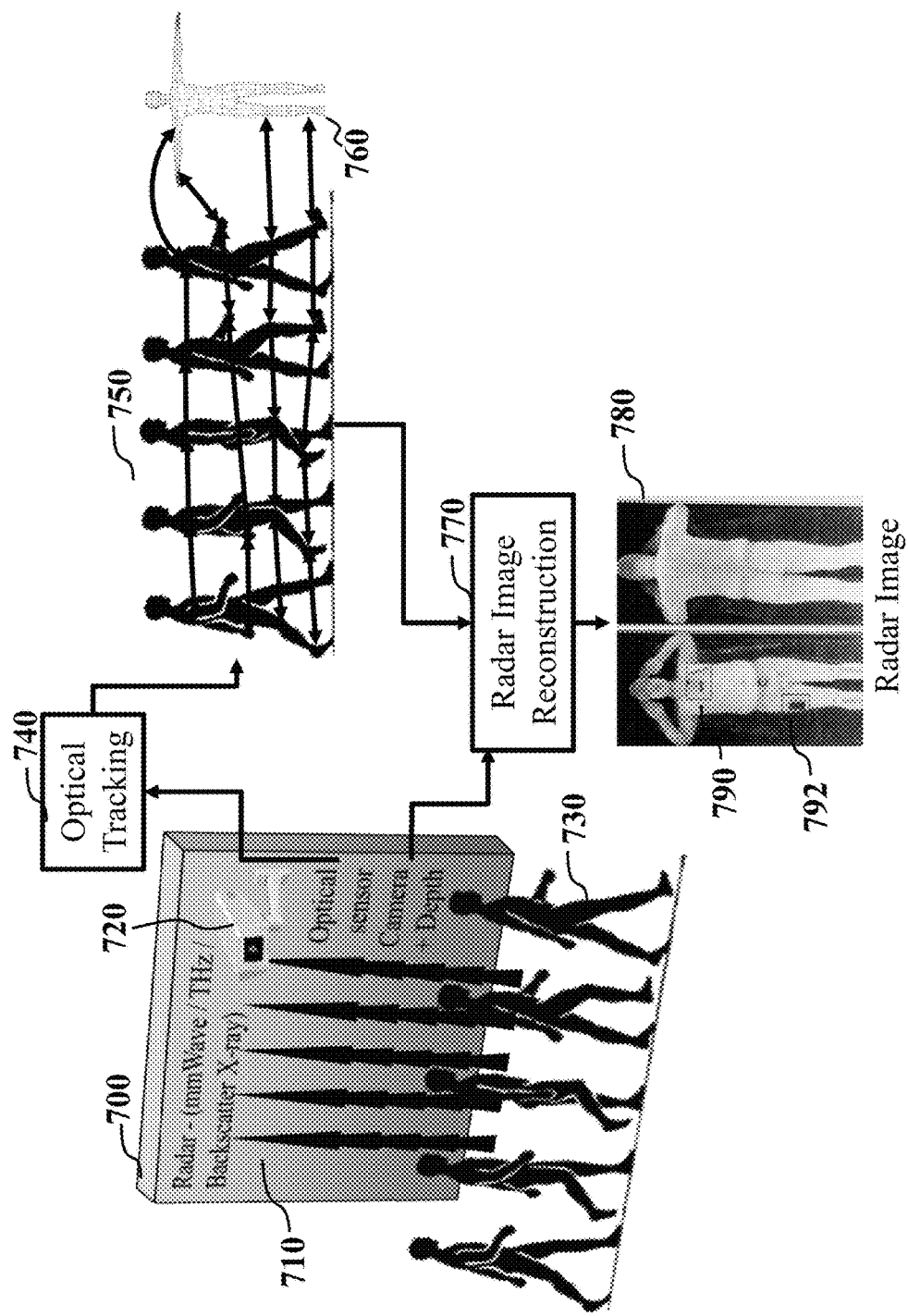
FIG. 7 shows a schematic of reconstruction of a radar reflectivity image, according to some embodiments of the present disclosure.

FIG. 7 shows a schematic of reconstruction of a radar reflectivity image, according to some embodiments of the present disclosure. In this embodiment, the radar imaging system includes one or more electromagnetic sensors, such as radar arrays 710, and one or more optical sensors 720. The object 730, for example a human, moves and deforms in front of the radar and the optical sensors, while the sensors acquire snapshots. The data acquired by the optical sensor are processed by an optical tracking system 740, which produces a tracking of the object and an inexact deformation 750 from snapshot to snapshot. The optical tracking system 740 may also map the optical deformation to object prototypical pose for the object, i.e., determines the mapping $F_i$ for each snapshot. This mapping is used together with the data acquired in each radar snapshot to correct the inexact estimate of the deformation and reconstruct 770 the radar reflectivity image of the object 780. The reconstructed radar reflectivity image may be represented in the prototypical pose by the system, by may be converted and represented in any pose and with any modifications suitable to the system or its user, for example to highlight parts of the image for further examination 790, 792.

In such a manner, the radar imaging system includes an optical tracking system including the optical sensor to produce each deformation to include an optical transformation between points of an optical reflectivity image including the object in the deformed shape and points of a prototypical optical reflectivity image including the object in the nominal shape. The processor of the radar imaging system determines the transformation as a function of the optical transformation.

Figure 8:
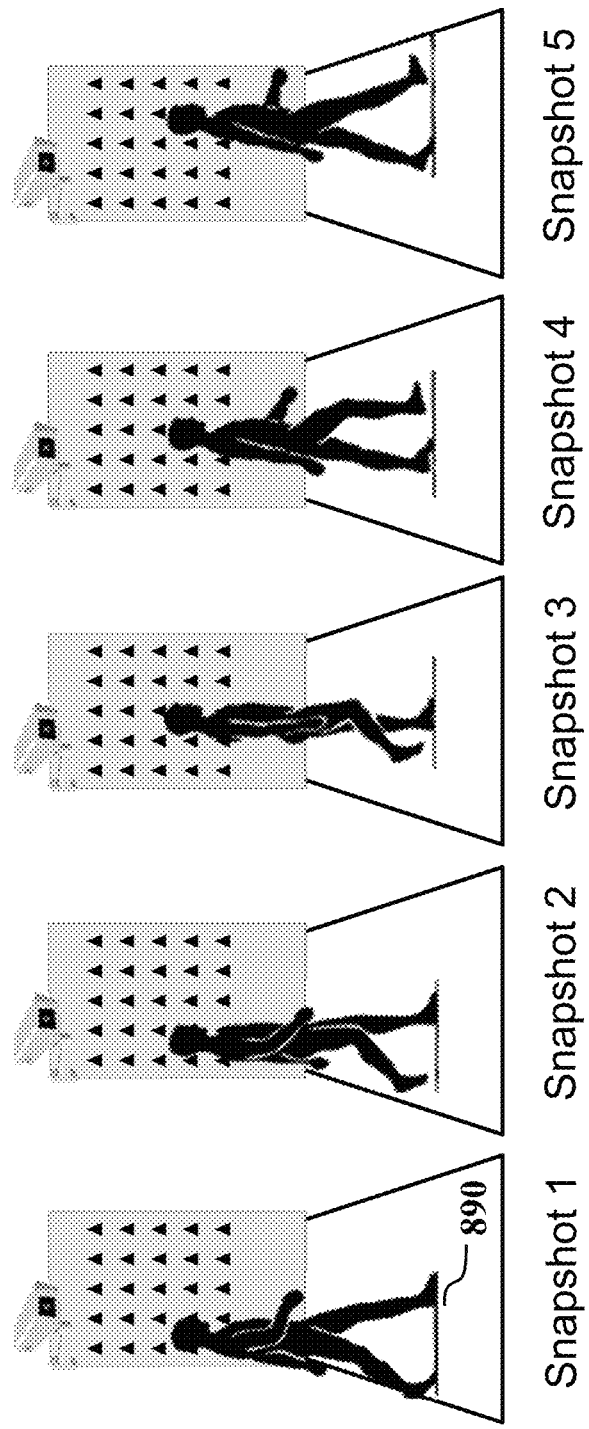
FIG. 8 shows an example of the motion and deformation of the object in front of the optical and radar sensors at each snapshot, according to some embodiments of the present disclosure.

FIG. 8 shows an example of the motion and deformation of the object in front of the optical and radar sensors at each snapshot, according to some embodiments of the present disclosure. In this example, a human 890 walks in front of the sensors. The sensors obtain snapshots at different time instances, with the object in different pose. For example, in FIG. 8, at each snapshot, the human is at a different position in front of the sensors, walking from left to right, and at a different pose, depending on the timing of each snapshot relative to the stride of the human.

Figure 9:
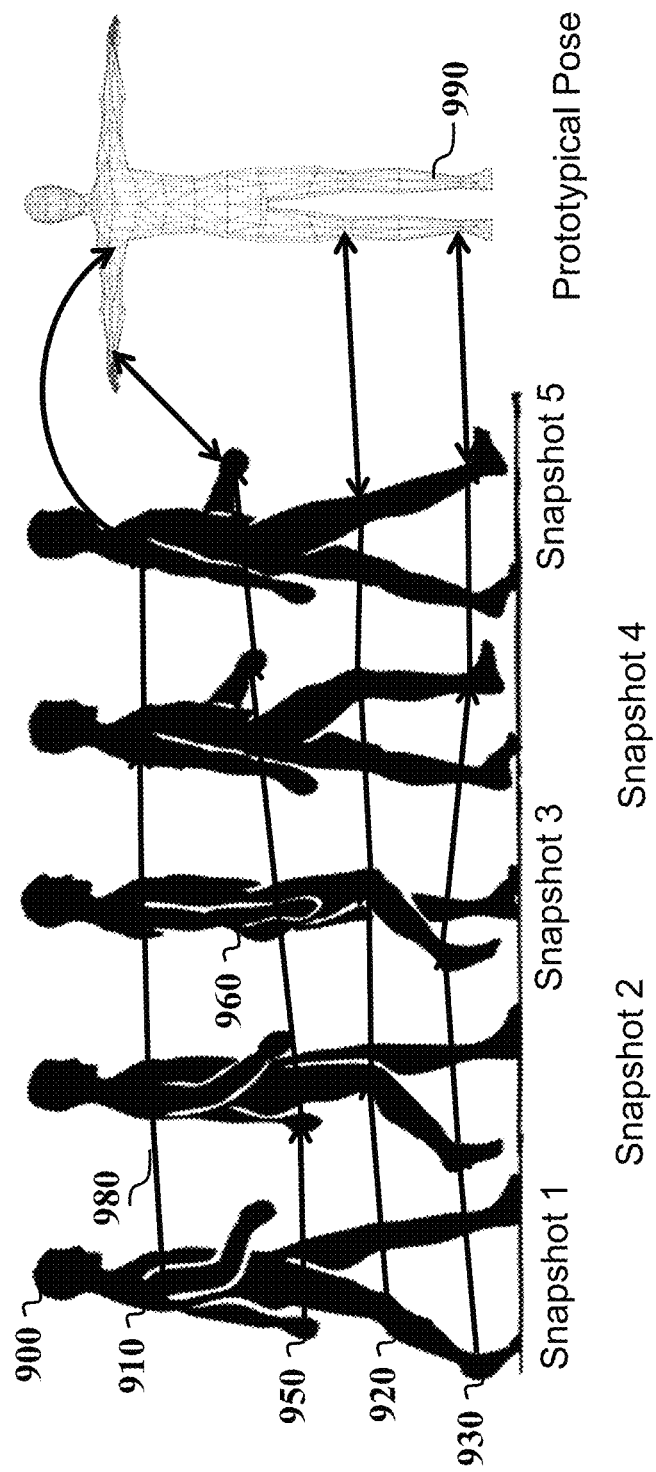
FIG. 9 shows a schematic of the tracking performed by the optical sensor using the example of FIG. 8, according to some embodiments of the present disclosure.

FIG. 9 shows a schematic of the tracking performed by the optical sensor using the example of FIG. 8, according to some embodiments of the present disclosure. Notably, there is a snapshot-based one-to-one correspondence between the deformation of the shape of the object in the optical reflectivity image and corresponding transformation of the radar reflectivity image.

Each point on the human 900 is tracked by the camera at each time instant, and then mapped to the corresponding point in the prototypical pose 990. Each point might or might not be visible in some snapshots. For example, points on the right shoulder 910, right knee 920, or right ankle 930 might always be visible, while points on the left hand 950 might be occluded when the hand in behind the body and not visible to the sensors 960. The tracking creates correspondences 980 between points in different snapshots and the corresponding point in the prototypical image. The correspondences are used to generate $\bar{F}_i$. If a point is not visible to the sensor at some particular snapshot, e.g., 960, the $\bar{F}_i$ does not map this point to the radar grid, i.e., the corresponding column of the operator contains all zeros. In that sense, $\bar{F}_i$ subsamples the prototypical radar image to only map the points that are visible in the particular snapshot, as determined by the optical sensor.

Still referring to FIG. 9, some embodiments are based on recognition that an estimate $F_i$ of $\bar{F}_i$ is inexact and contains errors. The errors can be modeled as $\bar{F}_i = P_i F_i$, where $P_i$ is a correction to the inexact estimate of the deformation. The correction $P_i$ has similar structure as $F_i$, but is less likely to deviate from the identity. In other words, $P_i$ is also a subsampled permutation or a more general operator which allows, e.g., blurring. However, because $P_i$ models the errors in the motion tracking, and the motion tracking is in approximately correct, the mapping that $P_i$ performs is only allowed to displace points a little bit away from the position the estimate $F_i$ placed them in. In summary, $F_i$, which is computed from the motion tracking part of the system, places the target grid in approximately the right position, and $P_i$ makes small corrections to this placement. To estimate an accurate correction, $P_i$, some embodiments of the present disclosure take the property that as $P_i$ increasingly deviates from the identity, the less likely it is to be accurate.

To that end, in some embodiments, the processor adjusts each transformation with a local error correction and determines concurrently the radar image of the object in the prototypical pose and each local error correction. For example, the processor determines concurrently the radar image of the object in the prototypical pose and each local error correction using one or combination of alternating minimization, projections, and constrained regularization.

Still referring to FIG. 9, those embodiments are based on recognition that the deformation error corrected using $P_i$ is generally unknown. Otherwise, if the error is known, it would have been trivial to correct the deformation error. Thus, the measurement system also estimates $P_i$ from the snapshots, in order to correct the error. In other words, in some embodiments, the processor of the imaging system is configured to solve $$\begin{bmatrix} y_1 \\ \vdots \\ y_T \end{bmatrix} = \begin{bmatrix} A_1 P_1 F_1 \\ \vdots \\ A_T P_T F_T \end{bmatrix} x, \qquad (5)$$

where all the $P_i$ are unknown, in addition to x.

At least one key realization in the present disclosure is that each unknown error correction $P_i$ moves elements of $F_i x$, i.e., x as deformed by the inexact deformation $F_i$, to different locations in the second grid. Since the inexact deformation already has moved elements of x to an approximately correct position, the deformation correction $P_i$ should not move them too far from where $F_i$ has located them. Thus, when estimating $P_i$, solutions that cause large movement of the elements of $F_i x$ should not be preferred.

Still referring to FIG. 9, on the other hand, the deformation correction $P_i$ should move elements of $F_i x$, such that they explain, i.e., match, the measurement data $y_i$. In order to explain the measurement data, the corrected deformed signal $P_i F_i x$, when measured by the forward operator $A_i$ should be as close as possible to the measured data $y_i$. Thus, when estimating $P_i$, solutions that produce measurements from the corrected deformed signal $A_i F_i x$ that do not match the measured data $y_i$ should not be preferred.

The preferences above represent different objectives that the desired solution should satisfy. Since these objectives are often competing, some embodiments of the present disclosure balance these objectives by determining a solution that combines them into a single cost function. To do so, some embodiments of the present disclosure determine a penalty or cost function that increases the more the solution deviates from the objective.

Still referring to FIG. 9, for example, to determine how well the solution explains the measurements, some embodiments may use a norm or distance function, computing the distance of the measurements of the corrected deformed signal $A_i P_i F_i x$ from the measured data $y_i$. In some embodiments this norm may be a $\ell_2$ norm, typically denoted as $\|y_i - A_i P_i F_i x\|_2$, although other norms, such as a $\ell_1$ or $\ell_\infty$ norm, or distance or divergence functions, such as a Kullbak-Leibler divergence, may be used. If, for a certain candidate solution, the measurements of the corrected deformed signal $A_i P_i F_i x$ do not match the measured data $y_i$, then this norm, distance, or divergence will be large, thus penalizing that candidate solution more than others. In contrast, if for a certain candidate solution, the measurements of the corrected deformed signal $A_i P_i F_i x$ match the measured data $y_i$, then this norm, distance, or divergence will be small, not penalizing this solution.

Similarly, to determine if the solution causes large distortion in the correction of the elements of the signal $F_i x$, some embodiments use a regularization function $R(P_i)$, which penalizes such solutions. A regularization function is a term in the art describing functions that depend only on the solution—not the measured data—and have a large value for undesired solutions and a small value for desired solutions, similarly to how distance or divergence functions take a large or small value depending on how well the solution matches the data, as described above.

Still referring to FIG. 9, some embodiments of the present disclosure use regularization functions that take a large value if the deformation $P_i$ moves elements of the deformed signal $F_i x$ very far from their position in the imaging domain, wherein the imaging domain may have one or two or more dimensions. For example, a regularization function might include the sum of the distances that each of the elements moves within the image, wherein the distance may be a Euclidian ($\ell_2$) distance, or a Manhattan ($\ell_1$) distance, or a square-Euclidian distance ($\ell_2^2$) or a maximum deviation ($\ell_\infty$) distance or some other distance as appropriate for the application.

In order to balance the competing objective of matching the measurements and determining deformations that do not move the elements too far from their position, embodiments of the present disclosure try to minimize a cost function that is the weighted sum of the two objectives $$\hat{P}_i, x = \underset{P_i,x}{\operatorname{argmin}} \left\{ \sum_i \|y_i - A_i P_i F_i x\|_2^2 + \beta R(P_i) \right\}, \quad (6)$$

where the cost is added over all deformations in all snapshots, indexed by i, the weight β determines the balance between matching the data and regularization, and the minimization recovers both the deformation corrections $P_i$, and the signal x being imaged.

Still referring to FIG. 9, this minimization is non-convex, and therefore difficult to solve. Furthermore, correct solutions should further enforce that $P_i$ is a permutation, or a subsampled permutation, such that the solution mathematically describes a permutation. However, determining permutations is a problem with combinatorial complexity, which is difficult and very expensive to solve.

In order to solve the problem, various embodiments of the present disclosure exploit a realization that, as corrections of the deformation are estimated, each correction of the deformation may produce an intermediate estimate of the deformed signal $x_i$ that helps explaining the measured data but does not exactly match the corrected deformed signal $P_i F_i x$. Therefore, a separate cost component can be included in the minimization (6) to balance how well the intermediate signal matches the corrected deformed permutation:

$$\hat{P}_i, x = \underset{P_i, x_i, x}{\operatorname{argmin}} \left\{ \sum_i \|y_i - A_i x_i\|_2^2 + \beta R(P_i) + \frac{\lambda}{2} \|x_i - P_i F_i x\|_2^2 \right\}, \quad (7)$$

where the last term, $\|x_i - P_i F_i x\|_2^2$, determines how well the intermediate signal $x_i$ matches the corrected deformed permutation $P_i F_i x$. It should be noted that, while (7) uses the $\ell_2$ norm squared, i.e., $\ell_2^2$, to quantify both how well the intermediate signal matches the corrected deformed permutation and how well the measurements of the intermediate signal match the measurement data, other norms or distances could be used, for example as enumerated above.

Still referring to FIG. 9, this realization is not obvious because it relaxes the problem and introduces more unknown variables, the intermediate signals $x_i$, i.e., makes the problem seemingly more difficult to solve. However, the advantage of this relaxation is that it allows the use of optimal transport (OT) theory and algorithms to solve part of the problem.

In particular, since $P_i$ is a permutation, the last term in the minimization (7) can be expressed as $\Sigma_{n,n'}(x_i[n]-(F_i x)[n'])^2 P_i[n, n']$, where the notation u[n] selects the $n^{th}$ element of a vector u, and the notation A [n, n'] selects the $n^{th}$ row and $n'^{th}$ column of $P_i$. In this expression, n and n', are indices on the first and second grid, respectively, i.e., n' indicates where the $n^{th}$ element from the first grid will move to on the second grid. Furthermore, the regularization R($P_i$) can be expressed as $\Sigma_{n,n'} \|l[n]-l'[n']\|_2^2 P_i[n, n']$, where l[n] and l'[n'] are the coordinates of points n and n' in the first and the second grid, respectively.

Still referring to FIG. 9, a further realization is that $P_i[n, n']$ can be factored out of these two expressions, to combine them into a single cost metric $$C(x_i, F_i x)[n,n'] = \|l[n]-l'[n']\|_2^2 + (x_i[n]-(F_i x)[n'])^2, \quad (8)$$

the product of which with $P_i[n, n']$ can be optimized over $P_i[n, n']$ being a permutation using OT algorithms known in the art. Using this factorization, the overall minimization (7) can be expressed as $$\hat{P}_i, x, x_i = \min_{x_i, x} \left\{ \sum_i \|y_i - A_i x_i\|_2^2 + \beta \min_{P_i} \langle C(x_i, F_i x), P_i \rangle \right\}, \quad (9)$$

where the notation $\langle \bullet, \bullet \rangle$ denotes the standard inner product, as well known in the art, namely the sum of the elementwise product of each component from the first argument with the corresponding component of the second argument, i.e., $\langle A, B \rangle = \Sigma_{n,n'} A[n, n'] B[n, n']$.

Still referring to FIG. 9, the OT literature provides algorithms and methods to determine a permutation $P_i$ that minimizes this inner product, known as the transport plan. The computation of this inner minimization in (9) is known in the art as the balanced OT problem $$OT_{balanced}(x, x_i) = \min_{P_i} \langle C(x_i, F_i x), P_i \rangle, \quad (10)$$

in which the $P_i$ that minimizes the OT problem is the OT plan. Solving the OT problem requires computing the optimal plan. The optimal plan provides a deformation in which all the elements of one snapshot are mapped to elements in the other snapshot. Thus, the OT problem does not allow for occlusion or otherwise missing elements, even though this is often encountered in applications.

Other embodiments of the present disclosure may use an unbalanced OT or a partial OT problem in (9), to replace the balanced OT from (10), more generally $$\hat{P}_i, x, x_i = \min_{x_i, x} \left\{ \sum_i \|y_i - A_i x_i\|_2^2 + \beta OT(x, x_i) \right\}, \quad (11)$$

where OT(x, $x_i$) represents an OT problem which may include balanced, unbalanced, partial or some other OT problem known in the art. The partial or unbalanced OT literature provides algorithms and methods to determine a subsampled $P_i$, i.e., one in which certain parts of one signal are occluded, i.e., are not part of the other signal and vice versa.

Still referring to FIG. 9, the OT problem is also known in the art as the 2-D assignment problem because it only computes a transport plan between a pair of signals, and it can be efficiently solved using a linear program. Solving (11) provides one approach to solving what is known in the art as the N-D assignment problem, which simultaneously computes all direct assignments between more than two signals, and which is generally known to be very hard. At least one key realization that provides some embodiments of the present disclosure to solve the N-D assignment problem is that instead of deforming all signals $x_i$ to match all other signals, it is more efficient to only deform each signal $x_i$ to match a common signal x, through the partially known deformation $F_i x$. This common signal serves in some sense as the template from which all other signals are deformed.

By deforming each signal to only match a common signal, the solution now only requires computing deformations between pairs of signals—the common one and each of the signals in the snapshots. Thus, the problem reduces to computing multiple pairwise assignments, i.e., 2-D assignments, since only two signals are involved, instead of a single multi-signal assignment, i.e., N-D assignments. This is beneficial because 2-D assignment problems are well-studied in the art and are much easier to solve. A further realization is that this reduction works even if the deformation is not known at all, and $F_i$ is the identity, i.e., implements no deformation.

Still referring to FIG. 9, the drawback in computing multiple 2-D assignments can be that it increases the unknown variables of the solution. A common signal x should now be computed in the process, making this reduction from N-D assignments to 2-D assignments non-trivial. Some embodiments of the present disclosure rely on the further realization that the gradient of the 2-D assignment problem can be computed in order to be able to use gradient descent methods to compute x, thus making the reduction from N-D assignments to 2-D assignments tractable.

The problem (11) involves minimizing over several variables, x, $x_i$, $P_i$, which are multiplicatively coupled. While the inner minimization over $P_i$ is understood in the art as the OT problem, the outer minimization over x, $x_i$ is a non-convex problem that is difficult to solve. In order to solve it, some embodiments of the present disclosure alternate between minimizing for $x_i$, considering x fixed, and minimizing for x, considering $x_i$ fixed. Other embodiments alternate between reducing the cost as a function of $x_i$, considering x fixed, and reducing the cost as a function of x, considering $x_i$ fixed.

Figure 10A:
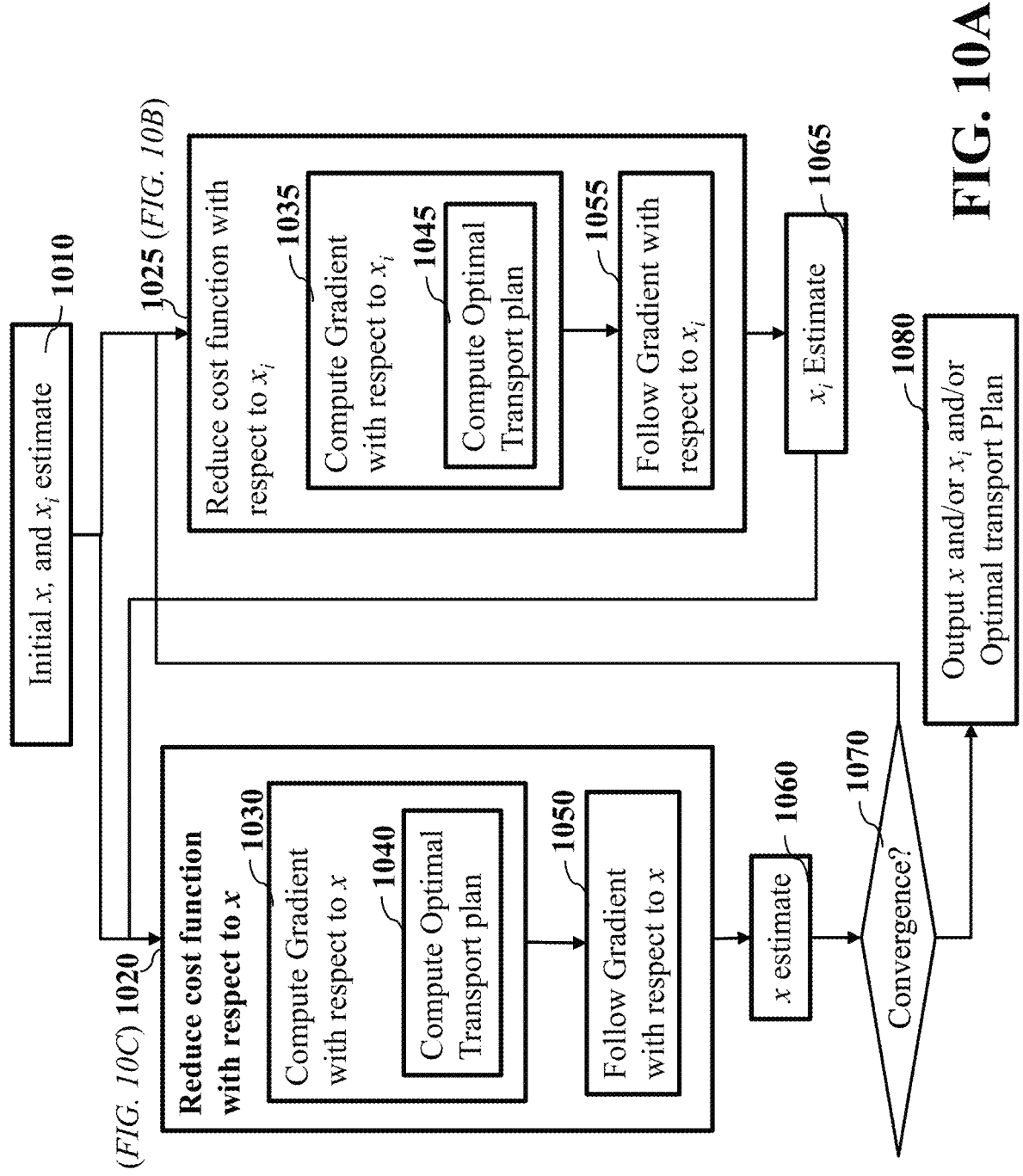
FIG. 10A shows a flowchart of the optimization procedure used to recover the deformations and the measured signal, according to some embodiments of the present disclosure.

FIG. 10A provides an overview schematic of the method to compute the minimization of the cost function in (11), according to some embodiments of the present disclosure. An initial estimate of x and $x_i$ is used as a starting point 1010. This estimate may be computed from the measurements using well known methods in the art, including but not limited to least squares inversion, matched filtering, back-projection, and sparse inversion, among others. In some embodiments, the initial estimates may be set to 0 or to a randomly generated signal.

FIG. 10B is an algorithm that can be used for reducing a cost function with respect to $x_i$ 1025, according to some embodiments of the present disclosure.

FIG. 10C is an algorithm that can be used for reducing a cost function with respect to x 1020, according to some embodiments of the present disclosure.

Referring to FIG. 10A, FIG. 10B and FIG. 10C, these initial estimates are updated by alternating between reducing the cost function with respect to x 1020 and reducing the cost function with respect to $x_i$ 1025, until convergence 1070. An example embodiment of reducing the cost function with respect to $x_i$ 1025 is shown in FIG. 10B, and an example embodiment of reducing the cost function with respect to x 1020 is shown in FIG. 10C. An embodiment of the alternating update procedure is summarized in FIG. 10D. In these examples, the algorithms proceed for a fixed number of iterations tMax. However, in other embodiments a convergence criterion may be used instead, as described below.

Referring to FIG. 10A, some embodiments of the present disclosure consider the system converged after a fixed number of iterations. Other embodiments consider the change in the cost function after each iteration and consider the system converged if the change is below a certain threshold for a fixed number of one or more iterations. Other embodiments consider the gradient of the cost function after each iteration and consider the system converged if the magnitude of the gradient is below a certain threshold for a fixed number of one or more iterations. Other embodiments consider a combination of the above, or other conditions that may include total processing time, magnitude of change on the estimated signals and whether the computed transport plan changed from one iteration to the next.

Still referring to FIG. 10A, FIG. 10B and FIG. 10C, in order to reduce or minimize the cost as a function of either x 1020 or $x_i$ 1025, some embodiments of the present disclosure compute the gradient of (11) with respect to either x or $x_i$, 1030 and 1030 respectively, and use the gradient to modify either x or $x_i$, 1050 and 1055 respectively, towards reducing or minimizing the cost in (11). In some embodiments, the gradient is computed by evaluating an expression for the derivative that has been analytically derived. Other embodiments may use auto-differentiation methods, now widely available in the art, that are able to compute a derivative of a function automatically, even if an explicit analytic expression is not available. In some embodiments, the computation of the gradient requires the computation of the inner minimization, i.e., the OT problem and the use of the computed OT plan in computing the derivative 1040 and 1045. In the example embodiments, the plan is computed in step 5 of FIG. 10B and FIG. 10C.

In order to compute the OT plan, some embodiments require the computation of an original and a target mass distribution for the problem, as shown in steps 2 and 4 in FIG. 10B and steps 1 and 4 in FIG. 10C. Some embodiments may, for example, use the signal estimates as a mass distribution, or the points of the signal with values above a certain threshold, or a uniform distribution over the location in which the signal values are above a certain threshold, or a uniform distribution over all possible signal locations, or a normalized distribution, or some other positive function over the signal value at each location, or a combination thereof.

Still referring to FIG. 10A, FIG. 10B and FIG. 10C, in some embodiments, the general procedure to reduce or minimize the cost with respect to either x or $x_i$ requires using the current estimate of x and $x_i$ to compute the derivative at the current estimate, with respect to either x or $x_i$, respectively, and then updating the estimate of either x or $x_i$, respectively, according to this derivative, using a gradient step, 1050 and 1055 respectively. This update step is $$x^{t+1} = x^t - \gamma^t \Sigma_i \nabla_x f(x^t, x_i), \qquad (12)$$

$$x_i^{t+1} = x_i^t - \gamma^t \nabla_{x_i} f(x, x_i^t), \qquad (13)$$

where $f(x, x_i) = \Sigma_i \|y_i - A_i x_i\|_2^2 + \beta OT(x, x_i)$ is the cost function in (11), $\nabla_x$ and $\nabla_{x_i}$ denote the gradient with respect to x and $x_i$, respectively, $\gamma^t$ is a gradient step size at step t, which may or may not be the same for (12) and (13), $x^t$ and $x_i^t$ are the variables being updated at step t, x and $x_i$ are the variables considered fixed at the corresponding step, and $x^{t+1}$ and $x_i^{t+1}$ are the updated variables.

Still referring to FIG. 10A, FIG. 10B and FIG. 10C, other embodiments use different methods to minimize (11), such as lifting to a higher space, by estimating the outer product of x and $x_i$ and imposing low-rank structure on the resulting object. However, these approaches increase the dimensionality of the problem significantly, and the resulting computational complexity, making them impractical for many applications.

After convergence, embodiments may produce in the output a combination of the computed optimal transport plan, and the final estimate of x or $x_i$ 1080.

FIG. 11A to FIG. 11E show experimentation performed on example embodiments, FIG. 11A shows a signal x in a prototypical position, FIG. 11B shows a $F_i x$ $1^{st}$ estimated deformation of the snapshot, FIG. 11C shows a $F_i x$ $2^{nd}$ estimated deformation of the snapshot, FIG. 11D and FIG.

E show actual deformations $x_i = P_i F_i x$ of x observed by the acquisition system, according to some embodiments of the present disclosure. The objective in this experiment is to correct the estimated approximate deformation in FIGS. 11B and 11C in order to recover the signal in FIG. 11A.

FIG. 12A shows the experimentation results of the experiment in FIG. 11A to FIG. 11E, according to aspects of the present disclosure. The figure plots the reconstruction accuracy for different measurement rates, i.e., number of measurements in the snapshots, compared to the size of the signal. The reconstruction accuracy is reported with respect to the normalized mean squared error in the recovered signal, where smaller error is better. The figure shows the comparison with a naïve approach in which the approximate deformation is assumed correct and a correction is not computed while still attempting to recover the signal (labeled "Ignore Pi, noiseless" and demarcated with a solid black line and x markers). It also shows the comparison with an approach to correct the approximate deformation known in the art, (labeled "Gradient, noiseless" and demarcated with a solid black line and +markers). Both comparisons are assuming no measurement noise, an unrealistic assumption, favorable to these two methods.

The performance of embodiments of the present disclosure in the presence of various levels of noise is demarcated using the dashed and lighter colored lines, label with "Input SNR=XXdB," where XX denotes the input noise level. Since these are noisy experiments, the variability of the methods is demarcated using the shaded areas around the lines, which represent one standard deviation above and below the average.

As evident in the figure, the prior art fails to accurately recover the signal, even in ideal conditions, with noiseless measurements and high measurement rate. In contrast, embodiments of the present disclosure are able to reconstruct the signal with high fidelity assuming sufficient measurement rate given the noise level.

FIG. 12B shows further experimentation results demonstrating the performance of the present embodiment under a fixed input SNR of 20 dB as the number of views increases. The figure plots the performance for two different measurement rates per view. As shown, the performance improves as the number of views—and, therefore, the total measurement rate—increases, and is better when the measurement rate per view is higher. In each experiment plotted, the total measurement rate is equal to the number of views multiplied by the measurement rate per view.

FIG. 13 shows a hardware diagram of different components of the radar imaging system 1300, according to some embodiments of the present disclosure. The radar imaging system 1300 includes a processor 1320 configured to execute stored instructions, as well as a memory 1340 that stores instructions that are executable by the processor. The processor 1320 can be a single core processor, a multi-core processor, a computing cluster, or any number of other configurations. The memory 1340 can include random access memory (RAM), read only memory (ROM), flash memory, or any other suitable memory systems. The processor 1320 is connected through a bus 1306 to one or more input and output devices.

These instructions implement a method for reconstructing radar reflectivity image of the object in the prototypical pose. To that end, the radar imaging system 1300 can also include a storage device 1330 adapted to store different modules storing executable instructions for the processor 1320. The storage device stores a deformation module 1331 configured to estimate the deformation of the object in each snapshot using measurements 1334 of the optical sensor data, a transformation module 1332 configured to obtain the transformations of the radar reflectivity images $F_i$, which is an estimate of $\overline{F}_i$ the optical deformation; and reconstruction module 1333 configured to solve for x in Equation (5) above using the estimate $F_i$ in place of the true $\overline{F}_i$, and optionally applying regularization, as described above. The storage device 1330 can be implemented using a hard drive, an optical drive, a thumb drive, an array of drives, or any combinations thereof.

Still referring to FIG. 13, the radar imaging system 1300 includes an input interface to receive measurements 1395 of the optical and electromagnetic sensors. For example, in some implementations, the input interface includes a human machine interface 1310 within the radar imaging system 1300 that connects the processor 1320 to a keyboard 1311 and pointing device 1312, wherein the pointing device 1312 can include a mouse, trackball, touchpad, joy stick, pointing stick, stylus, or touchscreen, among others.

Alternatively, the input interface can include a network interface controller 1350 adapted to connect the radar imaging system 1300 through the bus 1306 to a network 1390. Through the network 1390, the measurements 1395 can be downloaded and stored within the storage system 1330 as training and/or operating data 1334 for storage and/or further processing.

Still referring to FIG. 13, the radar imaging system 1300 includes an output interface to render the prototypical radar reflectivity image of the object in the prototypical pose. For example, the radar imaging system 1300 can be linked through the bus 1306 to a display interface 1360 adapted to connect the radar imaging system 1300 to a display device 1365, wherein the display device 1365 can include a computer monitor, camera, television, projector, or mobile device, among others.

For example, the radar imaging system 1300 can be connected to a system interface 1370 adapted to connect the radar imaging system to a different system 1375 controlled based on the reconstructed radar reflectivity image. Additionally or alternatively, the radar imaging system 1300 can be connected to an application interface 1380 through the bus 1306 adapted to connect the radar imaging system 1300 to an application device 1385 that can operate based on results of image reconstruction.

FIG. 14 is a schematic illustrating by non-limiting example a computing apparatus 1400 that can be used to implement some techniques of the methods and systems, according to embodiments of the present disclosure. The computing apparatus or device 1400 represents various forms of digital computers, such as laptops, desktops, workstations, personal digital assistants, servers, blade servers, mainframes, and other appropriate computers.

The computing device 1400 can include a power source 1408, a processor 1409, a memory 1410, a storage device 1411, all connected to a bus 1450. Further, a high-speed interface 1412, a low-speed interface 1413, high-speed expansion ports 1414 and low speed connection ports 1415, can be connected to the bus 1450. Also, a low-speed expansion port 1416 is in connection with the bus 1450. Contemplated are various component configurations that may be mounted on a common motherboard, by non-limiting example, 1430, depending upon the specific application. Further still, an input interface 1417 can be connected via bus 1450 to an external receiver 1406 and an output interface 1418. A receiver 1419 can be connected to an external transmitter 1407 and a transmitter 1420 via the bus 1450. Also connected to the bus 1450 can be an external memory 1404, external sensors 1403, machine(s) 1402 and an environment 1401. Further, one or more external input/output devices 1405 can be connected to the bus 1450. A network interface controller (NIC) 1421 can be adapted to connect through the bus 1450 to a network 1422, wherein data or other data, among other things, can be rendered on a third-party display device, third-party imaging device, and/or third-party printing device outside of the computer device 1400.

Still referring to FIG. 14, contemplated is that the memory 1410 can store instructions that are executable by the computer device 1400, historical data, and any data that can be utilized by the methods and systems of the present disclosure. The memory 1410 can include random access memory (RAM), read only memory (ROM), flash memory, or any other suitable memory systems. The memory 1410 can be a volatile memory unit or units, and/or a non-volatile memory unit or units. The memory 1410 may also be another form of computer-readable medium, such as a magnetic or optical disk.

Still referring to FIG. 14, a storage device 1411 can be adapted to store supplementary data and/or software modules used by the computer device 1400. For example, the storage device 1411 can store historical data and other related data as mentioned above regarding the present disclosure. Additionally, or alternatively, the storage device 1411 can store historical data similar to data as mentioned above regarding the present disclosure. The storage device 1411 can include a hard drive, an optical drive, a thumb-drive, an array of drives, or any combinations thereof. Further, the storage device 1411 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1409), perform one or more methods, such as those described above.

The system can be linked through the bus 1450 optionally to a display interface or user Interface (HMI) 1423 adapted to connect the system to a display device 1425 and keyboard 1424, wherein the display device 1425 can include a computer monitor, camera, television, projector, or mobile device, among others.

Still referring to FIG. 14, the computer device 1400 can include a user input interface 1417 adapted to a printer interface (not shown) can also be connected through bus 1450 and adapted to connect to a printing device (not shown), wherein the printing device can include a liquid inkjet printer, solid ink printer, large-scale commercial printer, thermal printer, UV printer, or dye-sublimation printer, among others.

The high-speed interface 1412 manages bandwidth-intensive operations for the computing device 1400, while the low-speed interface 1413 manages lower bandwidth-intensive operations. Such allocation of functions is an example only. In some implementations, the high-speed interface 1412 can be coupled to the memory 1410, a user interface (HMI) 1423, and to a keyboard 1424 and display 1425 (e.g., through a graphics processor or accelerator), and to the high-speed expansion ports 1414, which may accept various expansion cards (not shown) via bus 1450. In the implementation, the low-speed interface 1413 is coupled to the storage device 1411 and the low-speed expansion port 1415, via bus 1450. The low-speed expansion port 1415, which may include various communication ports (e.g., USB, Bluetooth, Ethernet, wireless Ethernet) may be coupled to one or more input/output devices 1405, and other devices a keyboard 1424, a pointing device (not shown), a scanner (not shown), or a networking device such as a switch or router, e.g., through a network adapter.

Still referring to FIG. 14, the computing device 1400 may be implemented in a number of different forms, as shown in the figure. For example, it may be implemented as a standard server 1426, or multiple times in a group of such servers. In addition, it may be implemented in a personal computer such as a laptop computer 1427. It may also be implemented as part of a rack server system 1428. Alternatively, components from the computing device 1400 may be combined with other components such as the embodiment of FIG. 13. Each of such devices may contain one or more of the computing device 1300 and the device 1400, and an entire system may be made up of multiple computing devices communicating with each other.

Features

An aspect can include the measurement sensor captures measurements of the object deforming in the scene over the multiple time steps for the time period, by continuously capturing snapshots of the object for the multiple steps for the period of time, and sequentially transmits the measurement data to the processor, where at each time step, the object exhibits a different deformation for the multiple time steps. Wherein an aspect is the tracking system tracks the deformable object during the same time period or a different time period, as that of the measurement sensor capturing snapshots of the object deforming.

Another aspect the deformation is wholly or partly caused by the object moving in the scene or that the deformation is wholly or partly caused by the measurement sensor moving while capturing the scene. Another aspect the system is a coherent imaging system, such as a radar imaging system, a magnetic resonance imaging system or an ultrasound imaging system. Further, an aspect is the correction to the estimates of the deformation of the object for each time step is computed using an optimization that minimizes a cost function that includes an amount of a distance of how far the estimated deformation moves elements of the object, and a level of a measurement of how the deformed object matches to the measurements of the tracking system. Wherein a further aspect is the matching the measurements of the corrected deformation of the object for each time step to measurements in the acquired snapshot of the object for that time step is based on using a cost function that penalizes an amount of a distance between measurements of the corrected deformations of the object and measurements in the acquired snapshot of the object for that time step. Wherein another further aspect is the estimating of the corrected deformation over other corrected deformations for that time step, is according to the distance between the corrected deformation and the initial estimate of the deformation, and based on using a cost function that penalizes more the corrections to the deformations, in which elements of the object move an amount of a distance farther, when compared to their deformed location.

An aspect is that an optimal transport problem, which includes a cost that penalizes deformations according to an amount of a distance of how far these deformations move elements of the object image from their position and a cost that penalizes deformations according to a level of a matching score of how well the measurements of the corrected deformations of the object match to the measurements of the tracking system. The aspect is that the object deforming in the scene is one of, a mammal including a human, an amphibian, a bird, a fish, an invertebrate or a reptile, wherein the object deforming in the scene is an organ inside a body of the human, an organ inside of the amphibian, an organ inside of the bird, an organ inside of the fish, an organ inside of the invertebrate or an organ inside of the reptile.

Another aspect is the final estimate of the deformation of the deformable object, the final image of the object, or both, are labeled as an object report, and outputted to, and received by, a communication network associated with an entity such as an operator of the system, the operator generates at least one action command that is sent to, and received by a controller associated with the system which implements the generated at least one action command, resulting in changing a property of the object based upon the object report. Wherein an aspect is the property of the object includes one or a combination of, a defect in the object, a medical condition of the object, a presence of a weapon on the object or a presence of an undesirable artifact on the object. Wherein another aspect is the at least one action command includes one or a combination of, a level of an object defect inspection from a set of different levels of object defect inspections, a level of an object medical testing from a set of different levels of object medical testing, a level of an object security and safety inspection from a set of different levels of object security and safety inspections.

Another aspect is that the tracking sensor has one or combination of an optical camera, a depth camera and an infrared camera, and wherein the electromagnetic sensor includes one or combination of a mmWave radar, a Thz imaging sensor, and a backscatter X-ray sensor, and wherein. Still another aspect is that the electromagnetic sensor is a plurality of electromagnetic sensors having a fixed aperture size, wherein the processor estimates the radar image of the object for each time step of the multiple time steps from the radar reflectivity image of the scene by combining measurements of each electromagnetic sensor from the plurality of electromagnetic sensors. Wherein the plurality of electromagnetic sensors are moving according to known motions, and wherein the processor adjusts the transformation of the radar reflectivity image of the object acquired by the plurality of electromagnetic sensors at the corresponding time step based on the known motions of the plurality of electromagnetic sensors for the corresponding time step. Wherein an aspect is a resolution of the radar reflectivity image of the scene is greater than resolutions of the initial estimates of the deformation of the object in each time step.

Definitions

Types of Radar and radar sensors: Radar can come in a variety of configurations in an emitter, a receiver, an antenna, wavelength, scan strategies, etc. For example, some radar can include Bistatic radar, Continuous-wave radar, Doppler radar, Frequency Modulated Continuous Wave (Fm-cw) radar, Monopulse radar, Passive radar, Planar array radar, pulse radars with arbitrary waveforms, Pulse-doppler, multistatic radars, Synthetic aperture radar, Synthetically thinned aperture radar, Over-the-horizon radar with Chirp transmitter, interferometric radars, polarimetric radars, array-based radars or MIMO (Multiple Input Multiple Output) radars (MIMO), etc. Contemplated is incorporating one or more types of radar and radar sensors with one or more embodiments of the radar imaging system of the present disclosure.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed:

1. An imaging system comprising:
   a tracking system to track a deforming object within a scene over multiple time steps for a period of time to produce an initial estimate of a deformation of the object for each time step;
   a measurement sensor captures measurement data by capturing snapshots of the object deforming in the scene over the multiple time steps for the time period; and
   a processor that calculates, for the measurement data, deformation information of the deforming object, based on using each acquired snapshot of the object having measurements of the object in a deformation for that time step, to produce a set of measurements of the object with deformed shapes over the multiple time steps, and that for each time step of the multiple time steps, the processor sequentially calculates deformation information of object, by computing a correction to the estimates of the deformation of the object,
   wherein the correction includes matching measurements of the corrected deformation of the object for each time step to measurements in the acquired snapshot of the object for that time step, and for each time step, select a corrected deformation over other corrected deformations for that time step, according to a distance between the corrected deformation and the initial estimate of the deformation, to obtain a final estimate of the deformation of the deformable object moving in the scene and a final image of the object moving within the scene.

2. The imaging system according to claim 1, wherein the measurement sensor captures measurements of the object deforming in the scene over the multiple time steps for the time period, by continuously capturing snapshots of the object for the multiple steps for the period of time, and sequentially transmits the measurement data to the processor, where at each time step, the object exhibits a different deformation for the multiple time steps.

3. The imaging system according to claim 1, wherein the tracking system tracks the deformable object during the same time period or a different time period, as that of the measurement sensor capturing snapshots of the object deforming.

4. The imaging system according to claim 1 wherein the deformation is wholly or partly caused by the object moving in the scene, or wherein the deformation is wholly or partly caused by the measurement sensor moving while capturing the scene.

5. The imaging system of claim 1, wherein the system is a coherent imaging system, such as a radar imaging system, a magnetic resonance imaging system or an ultrasound imaging system.

6. The imaging system of claim 1, wherein the tracking system includes at least one tracking sensor that is one or combination of an optical camera, a depth camera and an infrared camera, and wherein the measurement sensor is at least one electromagnetic sensor that includes one or combination of a mmWave radar, a Thz imaging sensor, and a backscatter X-ray sensor.

7. The imaging system of claim 1, wherein the correction to the estimates of the deformation of the object for each time step is computed using an optimization that minimizes a cost function that includes an amount of a distance of how far the estimated deformation moves elements of the object, and a level of a measurement of how the deformed object matches to the measurements of the tracking system.

8. The imaging system of claim 7, wherein the matching the measurements of the corrected deformation of the object for each time step to measurements in the acquired snapshot of the object for that time step is based on using a cost function that penalizes an amount of a distance between measurements of the corrected deformations of the object and measurements in the acquired snapshot of the object for that time step.

9. The imaging system of claim 7, wherein the estimating of the corrected deformation over other corrected deformations for that time step, is according to the distance between the corrected deformation and the initial estimate of the deformation, and based on using a cost function that penalizes more the corrections to the deformations, in which elements of the object move an amount of a distance farther, when compared to their deformed location.

10. The imaging system of claim 1, further comprising:
an optimal transport problem, which includes a cost that penalizes deformations according to an amount of a distance of how far these deformations move elements of the object image from their position, and a cost that penalizes deformations according to a level of a matching score of how well the measurements of the corrected deformations of the object match to the measurements of the tracking system.

11. The imaging system of claim 1, wherein the object deforming in the scene is one of, a mammal including a human, an amphibian, a bird, a fish, an invertebrate or a reptile, wherein the object deforming in the scene is an organ inside a body of the human, an organ inside of the amphibian, an organ inside of the bird, an organ inside of the fish, an organ inside of the invertebrate or an organ inside of the reptile.

12. The imaging system of claim 1, wherein the final estimate of the deformation of the deformable object, the final image of the object, or both, are labeled as an object report, and outputted to, and received by, a communication network associated with an entity such as an operator of the system, the operator generates at least one action command that is sent to, and received by a controller associated with the system which implements the generated at least one action command, resulting in changing a property of the object based upon the object report.

13. The imaging system of claim 12, wherein the property of the object includes one or a combination of, a defect in the object, a medical condition of the object, a presence of a weapon on the object or a presence of an undesirable artifact on the object.

14. The imaging system of claim 12, wherein the at least one action command includes one or a combination of, a level of an object defect inspection from a set of different levels of object defect inspections, a level of an object medical testing from a set of different levels of object medical testing, a level of an object security and safety inspection from a set of different levels of object security and safety inspections.

15. An image processing method, comprising:
tracking a deforming object within the scene over multiple time steps for a period of time via a tracking system to estimate a deformation of the object for each time step;
acquiring measurement data by continuously capturing snapshots of the object deforming in the scene over the multiple time steps for the period of time;
calculating, for the measurement data, deformation information of the deforming object, such that each acquired snapshot of the object includes measurements of the object in a deformation for that time step, to produce a set of measurements of the object with deformed shapes over the multiple time steps;
calculating deformation information of the object, by computing a correction to the estimates of the deformation of the object for each time step for the multiple time steps, such that the correction includes
matching measurements of the corrected deformation of the object for each time step to measurements in the acquired snapshot of the object for that time step, and for each time step, select a corrected deformation over other corrected deformations for that time step, according to a distance between the corrected deformation and the initial estimate of the deformation, to obtain a final estimate of the deformation of the deformable object moving in the scene and a final image of the object moving within the scene, which are stored.

16. A production apparatus comprising:
a tracking system to track a deforming object within a scene over multiple time steps for a period of time to produce an initial estimate of a deformation of the object for each time step;
a measurement sensor captures measurement data by capturing snapshots of the object deforming in the scene over the multiple time steps for the time period; and
a processor that calculates, for the measurement data, deformation information of the deforming object, based on using each acquired snapshot of the object having measurements of the object in a deformation for that time step, to produce a set of measurements of the object with deformed shapes over the multiple time steps, and for each time step, the processor sequentially calculates deformation information of the object, by computing a correction to the estimates of the deformation of the object for each time step for the multiple time steps, such that the correction includes
match measurements of the corrected deformation of the object for each time step to measurements in the acquired snapshot of the object for that time step, and for each time step, select a corrected deformation over other corrected deformations for that time step, according to a distance between the corrected deformation and the initial estimate of the deformation, to obtain a final estimate of the deformation of the deformable object moving in the scene and a final image of the object moving within the scene, which are stored.

17. A radar system to estimate a deformation of a deformable object moving in a scene, comprising:
- a tracking system having a tracking sensor to track the deforming object over multiple time steps for a period of time to produce an initial estimate of the deformation of the object for each time step of the multiple time steps, such that at each time step includes a different deformation;
- an electromagnetic sensor that captures measurements of the object deforming in the scene over the multiple time steps for the time period as measurement data, by capturing snapshots of the object moving over the multiple time steps
- a processor that calculates, for the measurement data, deformation information of the deforming object,
- wherein the electromagnetic sensor captures snapshots of the object deforming over the multiple time steps, each acquired snapshot of the object in the measurement data includes measurements of the object in a deformation for that time step, to produce a set of measurements of the object with deformed shapes over the multiple time steps, and
- wherein for each time step for the multiple time steps, the processor sequentially calculates deformation information of object, by computing a correction to the estimates of the deformation of the object for each time step for the multiple time steps, such that the correction includes
  - matching measurements of the corrected deformation of the object for each time step to measurements in the acquired snapshot of the object for that time step, and for each time step, select a corrected deformation over other corrected deformations for that time step, according to a distance between the corrected deformation and the initial estimate of the deformation, to obtain a final estimate of the deformation of the deformable object moving in the scene and a final image of the object moving within the scene; and
- output the final estimate of the deformation of the deformable object to one or more components of at least one output of the radar system or to another system associated with the radar system.

18. The radar system of claim 17, wherein the electromagnetic sensor is a plurality of electromagnetic sensors having a fixed aperture size, wherein the processor estimates the radar image of the object for each time step of the multiple time steps from the radar reflectivity image of the scene by combining measurements of each electromagnetic sensor from the plurality of electromagnetic sensors.

19. The radar system of claim 17, wherein the plurality of electromagnetic sensors are moving according to known motions, and wherein the processor adjusts the transformation of the radar reflectivity image of the object acquired by the plurality of electromagnetic sensors at the corresponding time step based on the known motions of the plurality of electromagnetic sensors for the corresponding time step.

20. The radar system of claim 17, wherein a resolution of the radar reflectivity image of the scene is greater than resolutions of the initial estimates of the deformation of the object in each time step.

21. A radar imaging method to reconstruct a radar reflectivity image of a scene including an object deforming within the scene, having steps of tracking the deforming object over multiple time steps for a period of time using a tracking system to produce an initial estimate of a deformation of the object for each time step, where at each time step there is a different deformation, and the step of acquiring measurement data by continuously capturing snapshots of the object deforming in the scene over the multiple time steps for the period of time, and another step of calculating, for the measurement data, deformation information of the deforming object, such that each acquired snapshot of the object includes measurements of the object in a deformation for that time step, to produce a set of measurements of the object with deformed shapes over the multiple time steps, the method comprising:
- calculating deformation information of the object, by computing a correction to the estimates of the deformation of the object for each time step for the multiple time steps, such that the correction includes
  - matching measurements of the corrected deformation of the object for each time step to measurements in the acquired snapshot of the object for that time step, and for each time step, select a corrected deformation over other corrected deformations for that time step, according to a distance between the corrected deformation and the initial estimate of the deformation, which is based on using an optimization that minimizes a cost function that includes an amount of a distance of how far the estimated deformation moves elements of the object, and a level of a measurement of how the deformed object matches to the measurements of the tracking system, to obtain a final estimate of the deformation of the deformable object moving in the scene and a final image of the object moving within the scene; and
- outputting the final estimate of the deformation of the deformable object and the final radar image of the object, to the radar system or another system associated with the radar system.

* * * * *